INVENTORS
Alden H. Jacobson
Fred A. Anderson
Harry W. Ostlund
BY John J. McCabe

Attorney

INVENTORS
Alden H. Jacobson
Fred A. Anderson
Harry W. Ostlund
BY John J. McCabe

Attorney

Aug. 16, 1966  A. H. JACOBSON ETAL  3,266,141
TOOL CHANGER
Filed Oct. 4, 1963  24 Sheets-Sheet 4

INVENTORS
Alden H. Jacobson
Fred A. Anderson
Harry W. Ostlund
BY John J. McCabe

Attorney

INVENTORS
Alden H. Jacobson
Fred A. Anderson
Harry W. Ostlund
BY John J. McCabe

Attorney

Aug. 16, 1966  A. H. JACOBSON ETAL  3,266,141
TOOL CHANGER
Filed Oct. 4, 1963  24 Sheets-Sheet 7

INVENTORS
Alden H. Jacobson
Fred A. Anderson
Harry W. Ostlund
BY John J. McCabe

Attorney

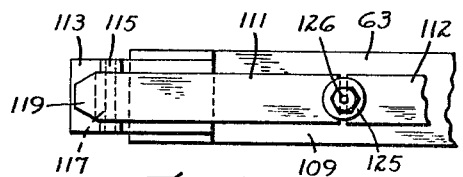
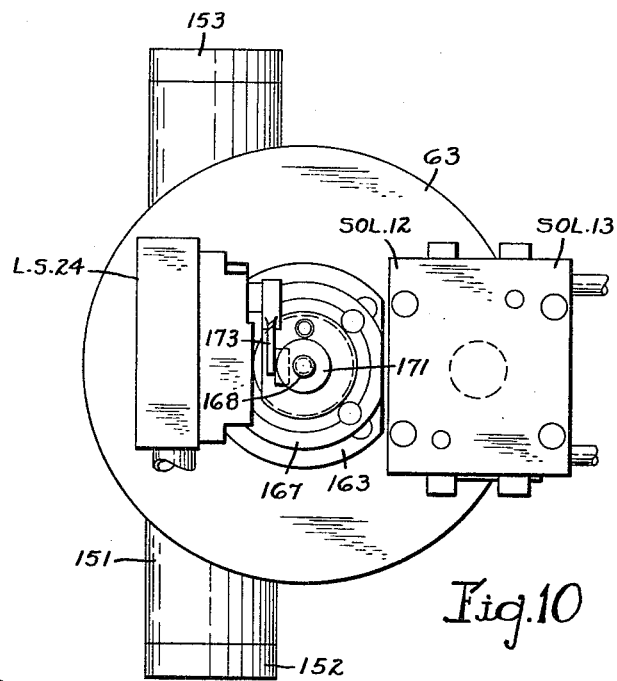
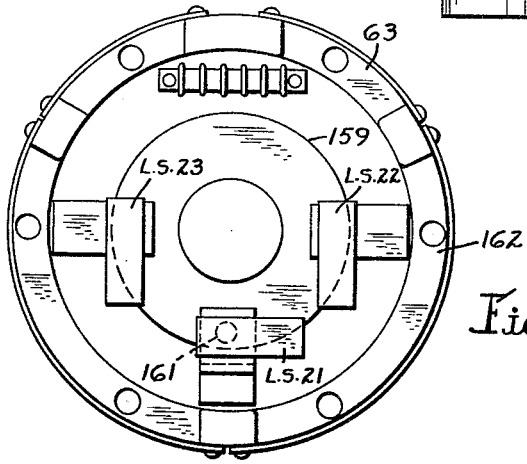
INVENTORS
Alden H. Jacobson
Fred A. Anderson
Harry W. Ostlund
BY John J. McCabe
Attorney INVENTORS
Alden H. Jacobson
Fred A. Anderson
Harry W. Ostlund
BY John J. McCabe Attorney Aug. 16, 1966 A. H. JACOBSON ETAL 3,266,141
TOOL CHANGER
Filed Oct. 4, 1963 24 Sheets-Sheet 11

*INVENTORS*
*Alden H. Jacobson*
*Fred A. Anderson*
*Harry W. Ostlund*
BY *John J. McCabe*

*Attorney*

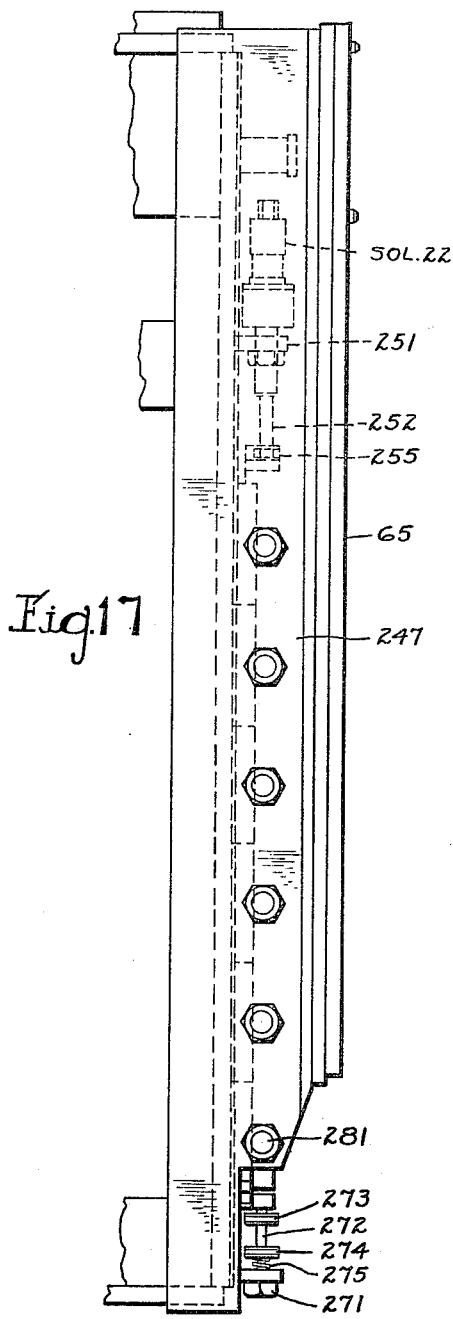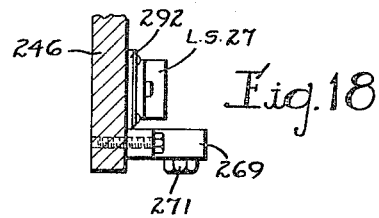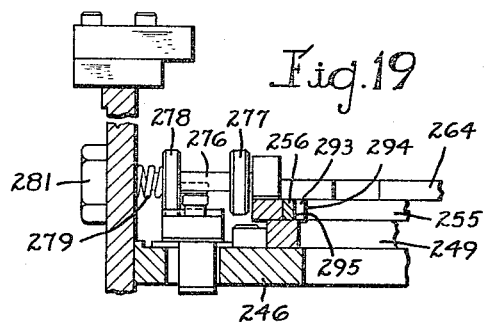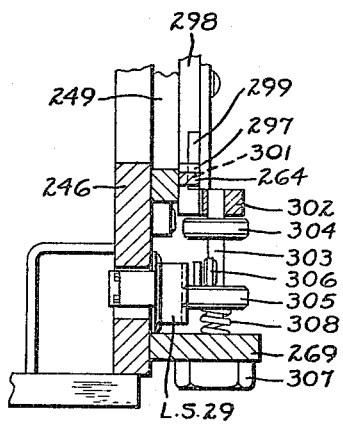

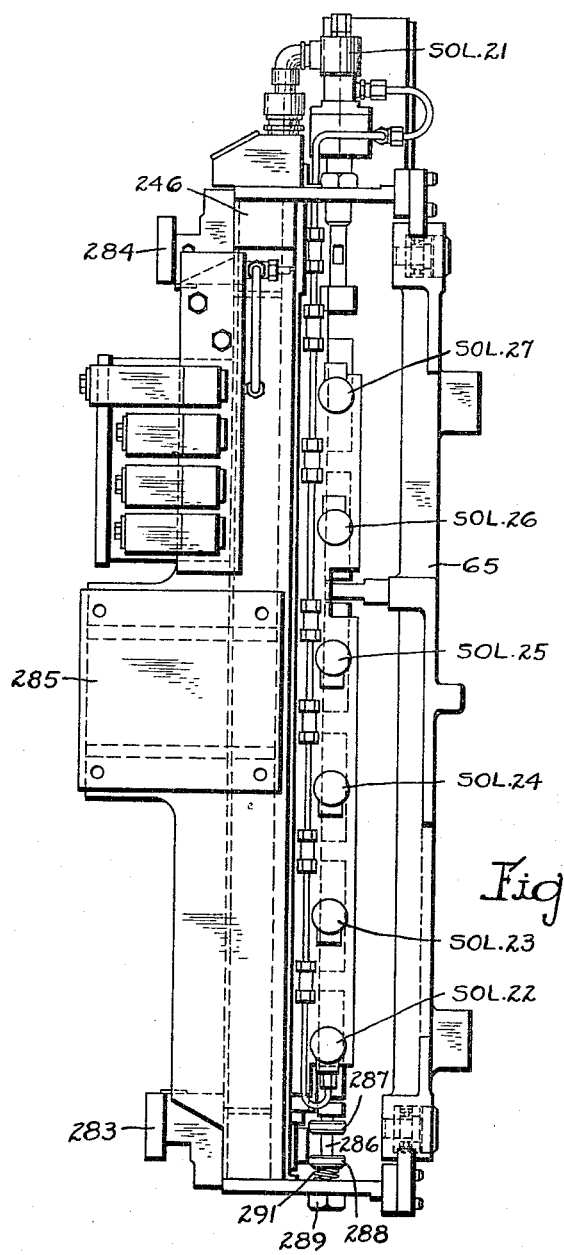
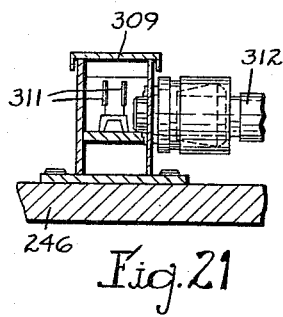
Fig. 22
Fig. 21
INVENTORS
Alden H. Jacobson
Fred A. Anderson
Harry W. Ostlund
BY John J. McCabe
Attorney

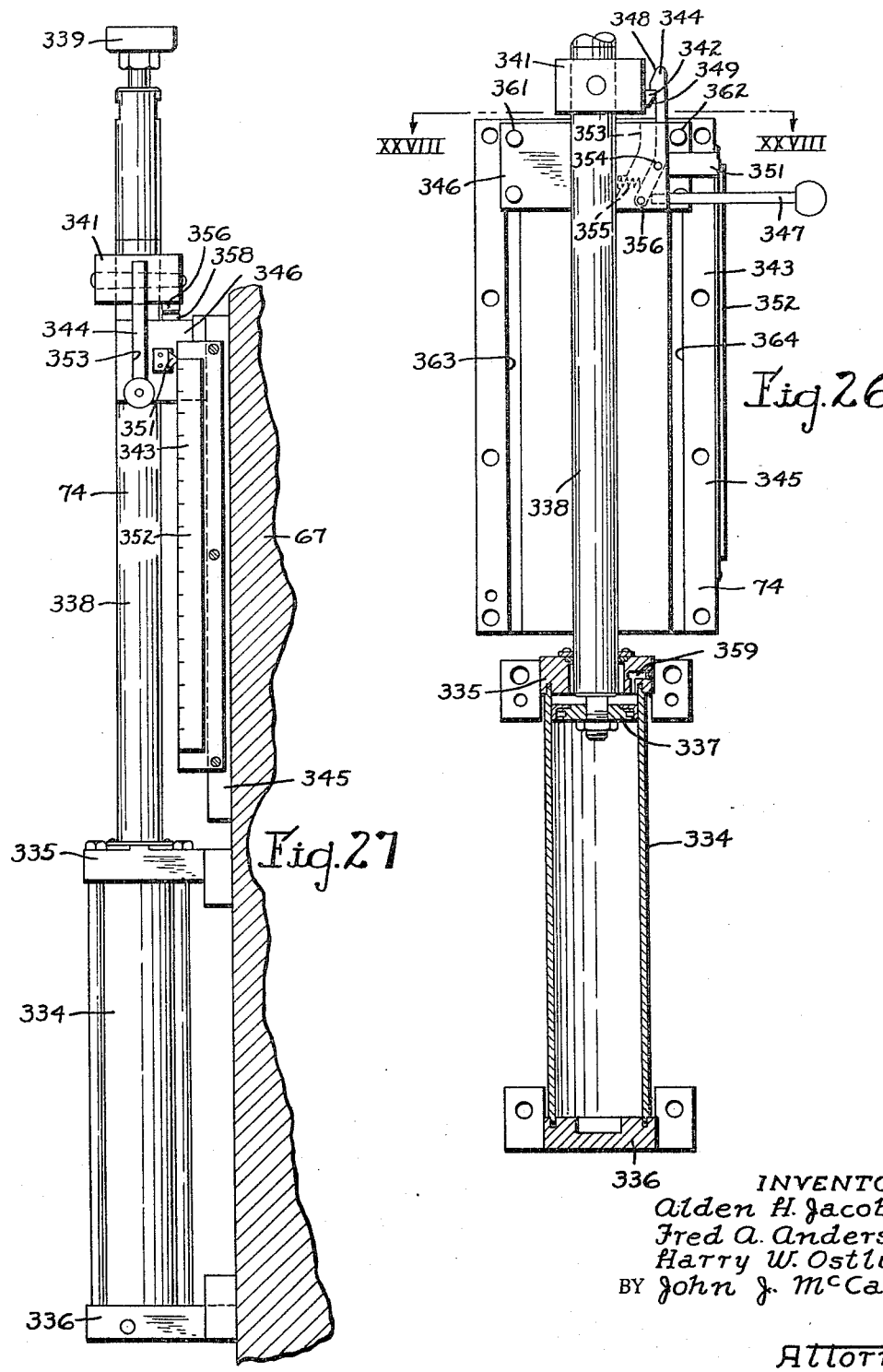

Aug. 16, 1966  A. H. JACOBSON ETAL  3,266,141
TOOL CHANGER
Filed Oct. 4, 1963  24 Sheets-Sheet 17

INVENTORS
Alden H. Jacobson
Fred A. Anderson
Harry W. Ostlund
BY John J. McCabe

Attorney

INVENTORS
Alden H. Jacobson
Fred A. Anderson
Harry W. Ostlund
BY John J. McCabe

Attorney

INVENTORS
Alden H. Jacobson
Fred A. Anderson
Harry W. Ostlund
BY John J. McCabe

Attorney

INVENTORS
Alden H. Jacobson
Fred A. Anderson
Harry W. Ostlund
BY John J. McCabe

Attorney

Aug. 16, 1966  A. H. JACOBSON ETAL  3,266,141
TOOL CHANGER
Filed Oct. 4, 1963  24 Sheets-Sheet 24

INVENTORS
Alden H. Jacobson
Fred A. Anderson
Harry W. Ostlund
John J. McCabe
BY
Attorney United States Patent Office 3,266,141
Patented August 16, 1966

3,266,141
TOOL CHANGER
Alden H. Jacobson, Paxton, Fred A. Anderson and Harry W. Ostlund, Holden, and John J. McCabe, Worcester, Mass., assignors to The Heald Machine Company, Worcester, Mass., a corporation of Delaware
Filed Oct. 4, 1963, Ser. No. 313,943
17 Claims. (Cl. 29—568)

This invention relates to a tool changer and, more particularly, to apparatus arranged to be used with a machine tool in providing it with various tools in a predetermined order of succession.

In the machining of workpieces, it is common practice to mount the workpiece on a horizontal table and to move the table from one position to another under a drill or boring spindle to perform successive operations on the workpiece. In doing this, it is necessary to change the tool which is attached to the spindle from time to time. In order to operate such a machine tool automatically, i.e., in accordance with instructions from a control source, it is necessary to provide an automatic means to change the tools as well as to provide an automatic means to move the workpiece from one position under the work spindle to another. Tool changing mechanisms in the past, however, have suffered from a number of deficiencies; they have been complicated and expensive, difficult to apply to various machine tools, and have been difficult to adapt to tape control. These and other difficulties experienced with the prior art devices have been obviated in a novel manner by the present invention.

It is, therefore, an outstanding object of the invention to provide a tool changer which is simple and rugged in construction, which is inexpensive to manufacture, and which is capable of a long life of useful, trouble-free service with a minimum of maintenance.

Another object of this invention is the provision of a tool changer which may be operated in conjunction with a tape-controlled machine tool, the tool changer being tape-controlled also.

A further object of the present invention is the provision of a tool changer intended for automatic operation in connection with an automatic machine tool.

It is another object of the instant invention to provide a tool changer in which the tools are positively held during transfer from storage to the machine tool.

It is a further object of the invention to provide a tool changer in which the tools are stored horizontally but are presented in a vertical condition to an automatic machine tool.

A still further object of this invention is the provision of a tool changer in which the tools are stored in a rack and are positively locked against either purposeful or accidental removal until the tool changer has been instructed to remove a particular tool.

It is a still further object of the present invention to provide a tool changer providing automatic positive location of tool removal and insertion apparatus relative to a storage cabinet.

Another object of the invention is the provision of a tool changer which may be quickly and positively located relative to the operating elements of a machine tool.

Another object of the invention is the provision of a tool changer which may be readily adjusted along with the adjustable spindle of an automatic machine tool.

Another object of the present invention is a tool changer which operates very rapidly to change the operative cutting instrument in a machine tool.

Another object of this invention is the provision of a tool changer granting random access to a large number of tool storage cells.

Another object of this invention is the provision of a tool changer whose storage and retrieval operations both take place while the machine tool is operating with another tool; that is to say, a first tool is stored and a second tool is placed in position to be quickly inserted in the machine tool, while a third tool is operating in the machine tool, so that no time is wasted in storage and retrieval operations.

Another object of the present invention is the provision of a tool changer which operates in close relationship to a machine tool, the larger portion of the weight of which is not supported by the machine tool, but which may be located very accurately relative to the operative elements of the machine tool.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is a perspective view of a tool changer embodying the principles of the present invention;
FIG. 2 is a front elevational view of the tool changer;
FIG. 3 is a side elevation of the tool changer;
FIG. 4 is a back elevational view of the tool changer;
FIG. 5 is an eenlarged view of a control panel forming part of the invention;
FIG. 6 is a perspective somewhat schematic view of the tool changer showing the location of certain solenoids and operating elements of the invention;
FIG. 7 is a front elevational view of an interchanger forming part of the invention;
FIG. 8 is a side elevational view of the interchanger;
FIG. 9 is a bottom view of the interchanger taken on the line IX—IX of FIG. 8;
FIG. 10 is a horizontal sectional view of the interchanger taken on the line X—X of FIG. 8;
FIG. 11 is a horizontal sectional view of the interchanger taken on the line IX—IX of FIG. 8;
FIG. 12 is a horizontal sectional view of the interchanger taken on the line XII—XII of FIG. 7;
FIG. 13 is a top plan view of the interchanger;
FIG. 14 is a front elevational view of a presenter element forming part of the invention;
FIG. 15 is a side elevational view of the presenter;
FIG. 16 is a front elevational view of a rack forming part of the invention;
FIG. 17 is a side elevational view of the rack;
FIG. 18 is a vertical sectional view of the rack taken on the line XVIII—XVIII of FIG. 16;
FIG. 19 is a vertical sectional view of the rack taken on the line XIX—XIX of FIG. 16;
FG. 20 is a vertical sectional view of the rack taken on the line XX—XX of FIG. 16;
FIG. 21 is a vertical sectional view of the invention taken on the line XXI—XXI of FIG. 16;
FIG. 22 is a top plan view of the rack;
FIG. 23 is a side elevational view of a presenter stop forming part of the invention;
FIG. 24 is a front elevational view of the presenter stop;
FIG. 25 is a vertical sectional view of the presenter stop taken on the line XXV—XXV of FIG. 23;
FIG. 26 is a front elevational view of a rack adjusting cylinder;
FIG. 27 is a side elevational view of the rack adjusting cylinder;
FIG. 28 is a sectional view of a rack adjusting cylinder taken on the line XXVIII—XXVIII of FIG. 26;
FIG. 29 is a longitudinal sectional view of a tool holder;
FIG. 30 is an end view of the tool holder;

FIG. 31 is a schematic view showing the hydraulic circuitry of the invention;

FIGS. 32, 33, 34, 35, and 36 are electrical schematic views of the electrical apparatus used in conjunction with the invention;

Figure 1:
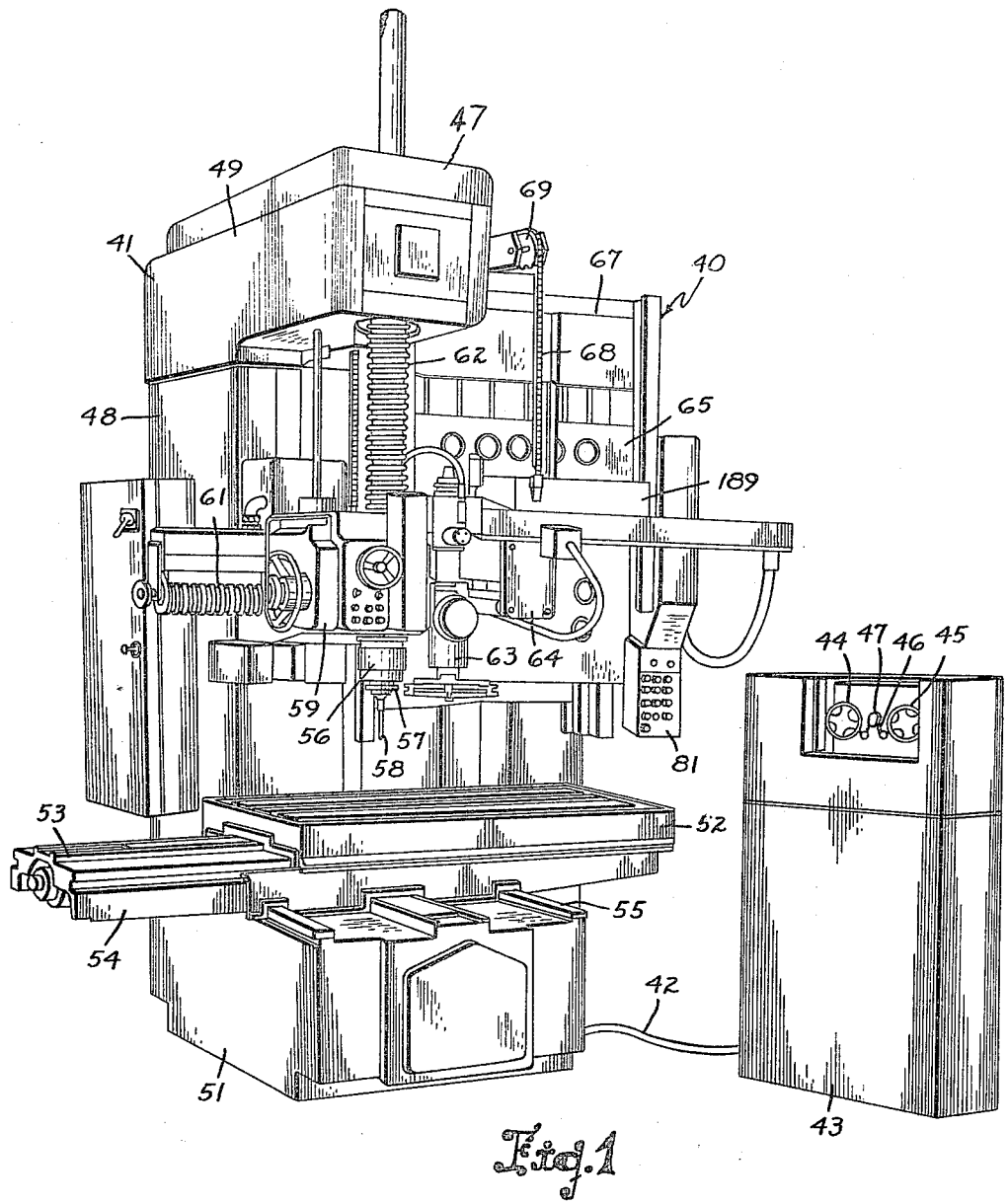

Referring first to FIG. 1, which best shows the general features of the invention, it can be seen that the tool changer, indicated generally by the reference numeral 40, is shown in use with a machine tool 41, the machine tool and the tool changer being connected by a cable 42 to a tape-regulated numerical control apparatus 43. The control apparatus is of the well-known type having reels 44 and 45 with a perforated tape 46 passing from one reel to the other through a pickup head 47. The pickup head converts the pulses to numerical control signals which pass through the cable 42 to operate the tool changer 40 and the machine tool 41. The machine tool 41 is shown for the purposes of illustration as a vertical drill having a main body 48 from which extends an upper horizontal body 49 and a lower horizontal base 51. Mounted on the base is a table 52 adapted to carry a workpiece. The table 52 is carried on transverse ways 53 formed on the upper surface of an intermediate table 54, so that the table 52 can slide transversely across the table 54. The table 54, on the other hand, is mounted on ways 55 which are formed on the upper part of the base 51 and which extend from front to back of the machine to permit motion of the table 52 and the intermediate table 54 in a front-to-rear direction. Suitable means is provided for permitting the table 52 and the table 54 to move in their respective directions to locate the workpiece in a desired position relative to a vertical spindle 56 which, in turn, is suitably mounted for vertical movement in the machine tool 41.

The lower end of the spindle carries a tool holder 57 which, in turn holds a tool 58 which, for the purposes of description, is shown as a drill. The spindle is suitably mounted in bearings in an adjustable housing 59 which is mounted for vertical adjustment on the main body 48 of the machine tool. The spindle is rotated by a motor in the usual way and is automatically fed downwardly into the work, the depth of the feed being determined by a control box 61. The spindle extends upwardly into the upper body 49 and is protected by a corrugated rubber boot 62.

Figure 2:
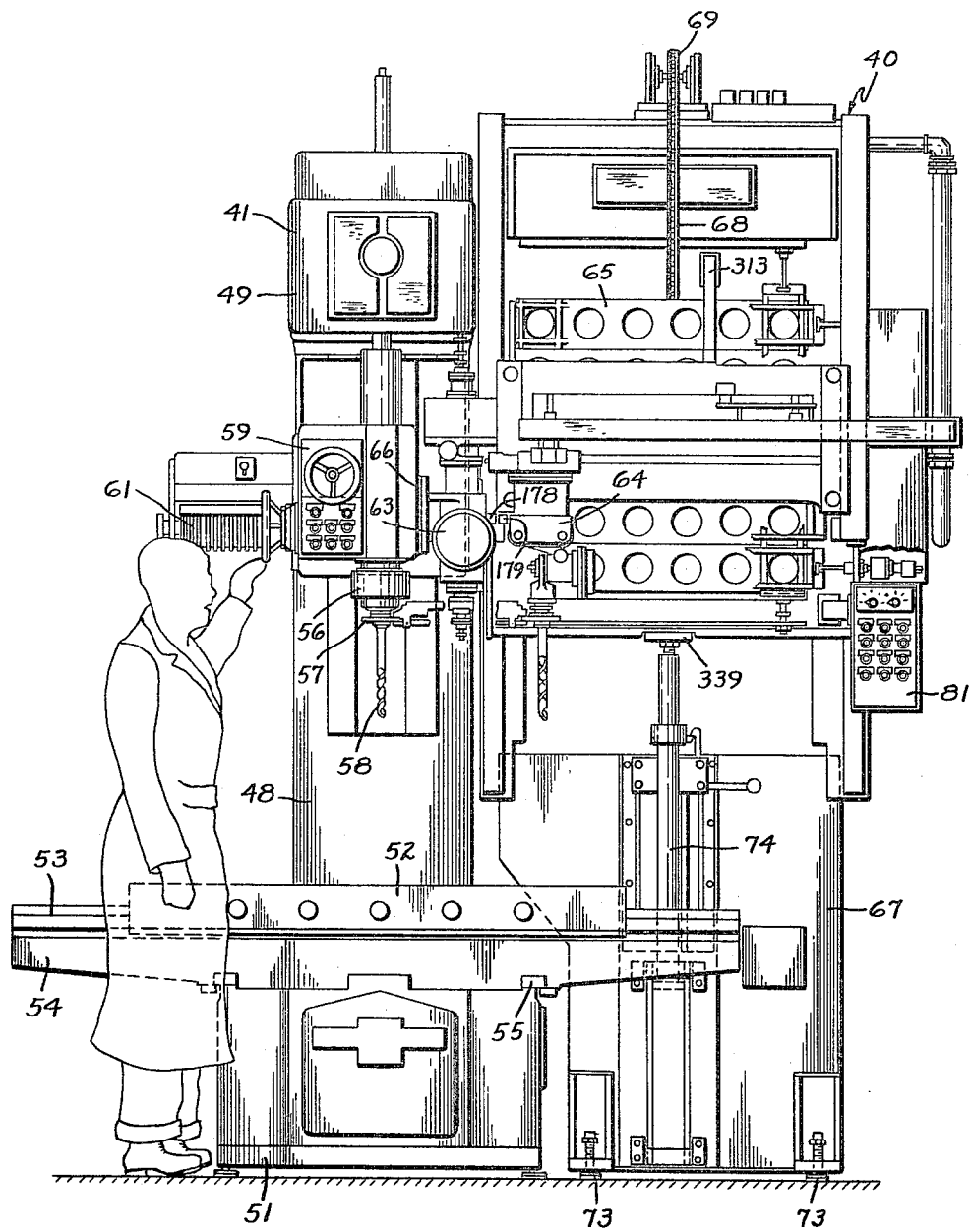
Figure 3:
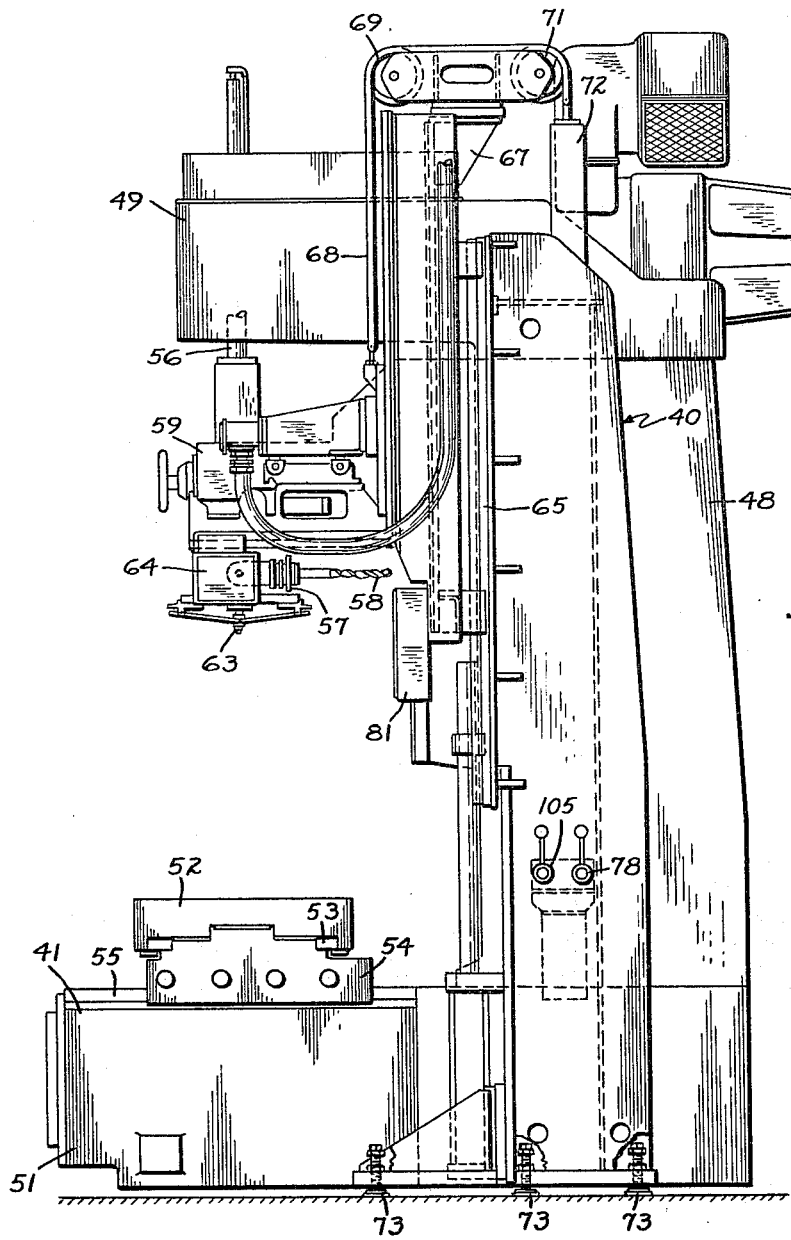

Referring now to FIGS. 1, 2, and 3, it can be seen that the tool changer 40 is made up of an interchanger 63, a presenter 64, and a rack 65. Mounted at the right-hand side of the rack is a control panel 81. The interchanger 63 is provided with a flange 66 by which it is mounted on a suitable flat surface of the housing 59 of the machine tool, is totally supported by the machine tool, and is free of the other parts of the tool changer. The presenter 64, on the other hand, is mounted at the front of the rack 65 and is slidable vertically thereof. At the same time, the rack 65 is also mounted on a main supporting structure 67 of the tool changer. This main supporting structure is mounted on the floor of the shop independently of the machine tool 41, as will be described more fully hereinafter. Fastened to the upper edge of the rack 65 is a link chain 68 which extends over the top of the main supporting structure 67, is guided by sprocket wheels 69 and 71, and is fastened at the rear of the supporting structure to a hydraulic counterweight 72. The bottom of the main supporting structure 67 is provided with a number of leveling screws 73. The rack 65 is adjustable to various vertical positions by means of an adjusting cylinder 74.

Figure 4:
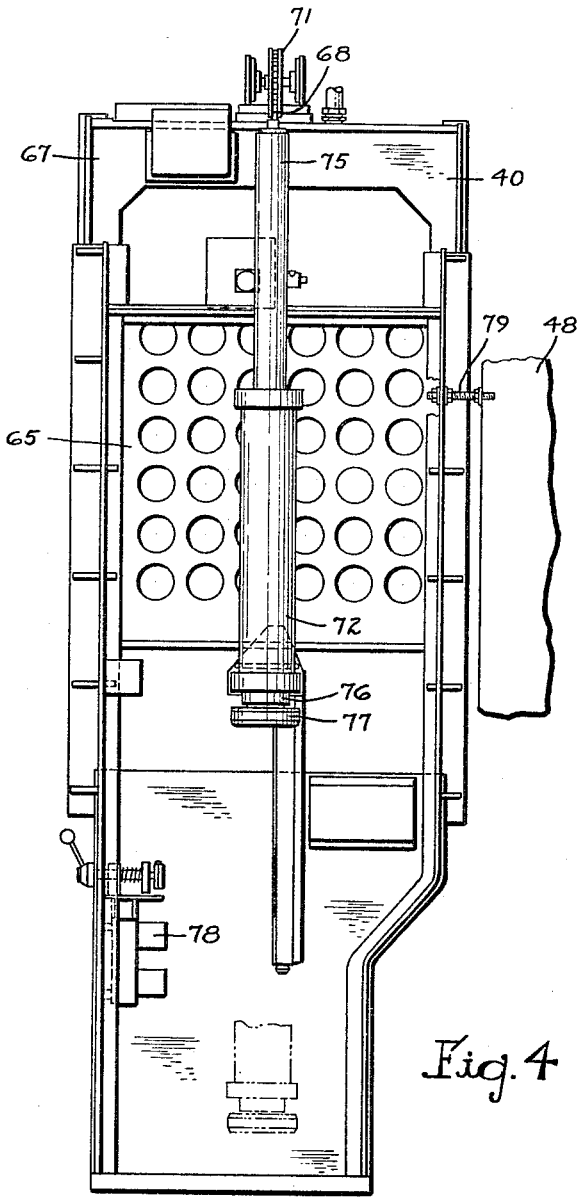

FIG. 4 shows the tool changer 40 as it appears from the rear. The main supporting structure 67 is somewhat open so that the rear side of the rack 65 can be seen. Evident in this view is the sprocket wheel 71 over which passes the chain 68 which is attached to a piston rod 75 of the hydraulic counterweight 72. From the lower end of the cylinder of the counterweight extends a lower piston rod 76 having a switch-actuating head 77 which moves up and down with the counterweight. Mounted on a side wall of the supporting structure 67 is a valve 78, which will be described more fully hereinafter. An adjustable screw 79 extends between the main supporting structure and the main body 48 of the machine tool 41 to lend lateral stability to the two elements.

Figure 5:
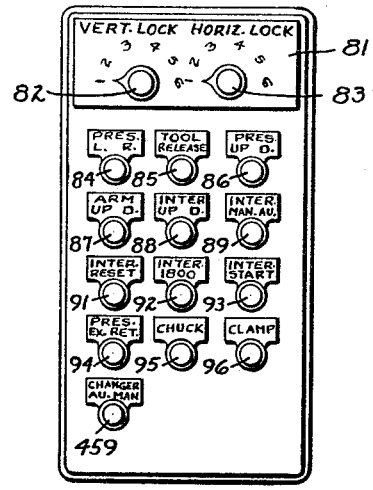

FIG. 5 shows the control box 81, this control box permitting manual operation of the machine when desired. In the upper portion, it is provided with a vertical selector switch 82 and a horizontal selector switch 83. In addition, the main body is provided with two-position selector switches including a presenter switch 84 having "LEFT" and "RIGHT" positions, a tool release P.B. 85, a presenter switch 86 having "UP" and "DOWN" positions, an arm switch 87 having "UP" and "DOWN" positions, an interchanger switch 88 having "UP' and "DOWN" positions, and an interchanger switch 89 having "MANUAL" and "AUTOMATIC" positions. In addition, the control box has an interchanger reset switch 91, an interchanger 180° switch 92, and an interchanger start switch 93. In a bottom row the control box 81 is provided with a presenter switch 94 having "EXTEND" and "RETRACT" positions, a chuck switch 95 and a clamp switch 96. Also, located at the bottom is a changer switch 459 having "AUTO" and "MANUAL" positions.

Figure 6:
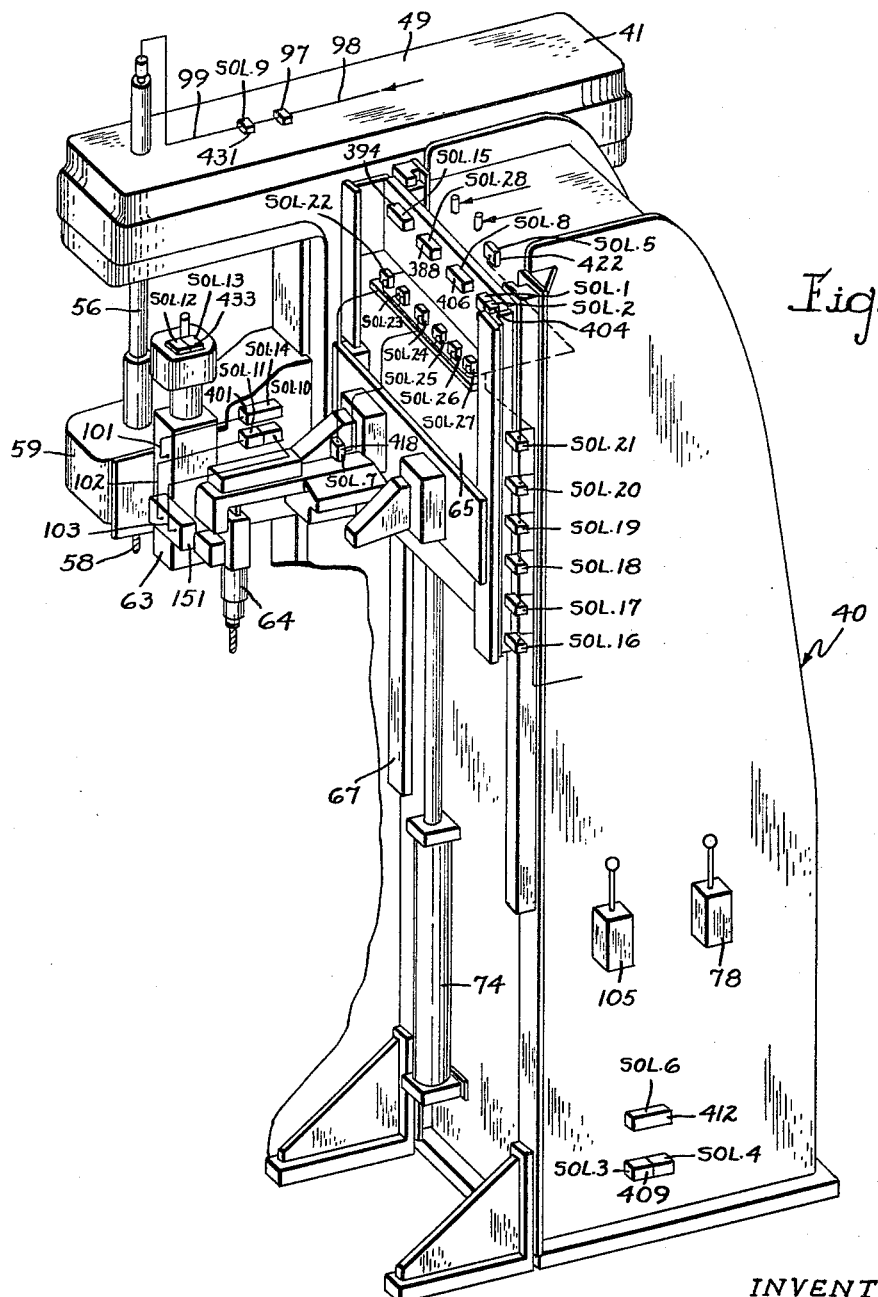

FIG. 6 shows somewhat schematically the general layout of solenoids on the various parts of the machine. Each solenoid operates a valve, but the description of the valves will be omitted for the present. For instance, the solenoid SOL 9 is mounted on a flat, horizontal upper surface of the upper body 49 of the machine tool and its valve is mounted in series with a regulating valve 97 which, in turn, is connected by a line 98 to the pressure air supply of the shop. The solenoid valve, on the other hand, is connected by a line 99 to the upper end of the spindle 56 to operate the chuck at the bottom of the spindle which holds the tool holder 57 and the tool 58. Mounted on the upper end of the interchanger 63 are clamp and unclamp solenoids SOL 12 and SOL 13. Mounted on the side of the housing 59 of the machine tool is a solenoid SOL 14 whose valve is connected by a line 101 to the body of the interchanger 63. Similarly, mounted on the side of the housing 59 are solenoids SOL 11 and SOL 10 whose valves are connected by lines 102 and 103, respectively, to the body of the presenter 63. Mounted on the upper surface of the presenter 64 is a solenoid SOL 7. Arranged along the top of the rack 65 is a series of solenoids SOL 22, SOL 23, SOL 24, SOL 25, SOL 26, and SOL 27 whose valves are connected to a common hydraulic line 104. Similarly, arranged along the right-hand side of the rack in a vertical row are solenoids SOL 16, SOL 17, SOL 18, SOL 19, SOL 20, and SOL 21 whose valves are similarly connected to the hydraulic line 104. Mounted at the top of the tool changer on the main supporting structure 67 is a number of solenoids SOL 1, SOL 2, SOL 5, SOL 8, SOL 15 and SOL 28. Located at the bottom right-hand side of the tool changer main frame are solenoids SOL 3, SOL 4, and SOL 6. Also mounted in the same location are the storage rack "DOWN" valve 78 and the storage rack "UP" valve 105.

INTERCHANGER

FIGS. 7, 8, 9, 10, 11, 12, and 13 show the details of the interchanger 63. The interchanger 63 is provided with a main housing 106 having the previously-described flange 66 which is bolted to the side of the housing 59 of the machine tool. Extending vertically through the housing 106 is a tubular shaft 107 within which is slidably carried an actuating shaft 108. Both shafts 107 and 108 extend below the main housing 106 and the hollow shaft 107 is provided with a rigid horizontal arm 109 which extends horizontally in both directions. The actuating shaft 108 is provided with clamping arms 111 and 112. The opposite ends of the arm 109 are provided with clamping jaws 113 and 114 below which extend bifurcations 115 and 116, respectively. The clamping arm 111 is hingedly attached near its outer end between the bifurcation 115 by means of a pivot pin 117, while the arm 112 is similarly hinged in the bifurcation 116 by means of a pivot pin 118. The arm 111 has a clamping jaw 119 extending outwardly beyond the pivot pin 117 and underlying the clamping jaw 113 of the arm 109. Similarly, the arm 112 is provided with a clamping jaw 121 which extends beyond the pivot pin 118 and which underlies the clamping jaw 114. The upper surfaces of the clamping jaws 119 and 121 are cylindrical, the cylindrical surfaces having their axes tangential to a circle concentric to the shaft 108. The inner ends of the arms 111 and 112 are provided with ball heads 122 and 123 which are held between collars 124 and 125 mounted on the lower end of the actuating shaft 108. The assembly of ball heads and collars is held in place against a shoulder on the shaft by means of a nut 126 threaded on the lower end of the shaft. The arm 109, incidentally, is similarly held against a shoulder on the hollow shaft 107 by means of a nut 127 threaded on the bottom end thereof. A control box 128 is mounted on the outer surface of the main housing 106 and contains certain limit switches. These are limit switches LS26 and LS25 which are engaged, on occasion, by a finger 129 which is mounted in a block 131 which, in turn, is mounted in a slot in the side of the housing 106. The block 131 and the finger 129 are held in a central location in the slot 132 by spring-loaded vertical fingers 133 and 134. The block extends inwardly of the housing 106 and rides in a recess 135 formed on the outer surface of a sleeve 136. The sleeve 136 is provided with bearings 137 and 138 and the hollow shaft 107 is carried in these bearings for rotation. The sleeve 136 is mounted in the housing 106 for a vertical sliding movement relative thereto. On the other side of the housing 106 is mounted a vertically-arranged cylinder 139 having cylinder heads 141 and 142. Carried in the cylinder is an elongated piston 143 formed with a rack 144. This rack engages a pinion 145 and the pinion, in turn, engages a rack 146 formed on the outer surface of the sleeve 136 opposite the recess 135. Suitable apparatus 147 and 148 are provided at the respective ends of the piston 143 to assure that when the piston arrives at the ends of the stroke it does not do so with a destructive amount of shock. Fastened to the top of the sleeve 136 is a housing 149 to the side of which is fastened a cylinder 151 having cylinder heads 152 and 153.

Figure 8:
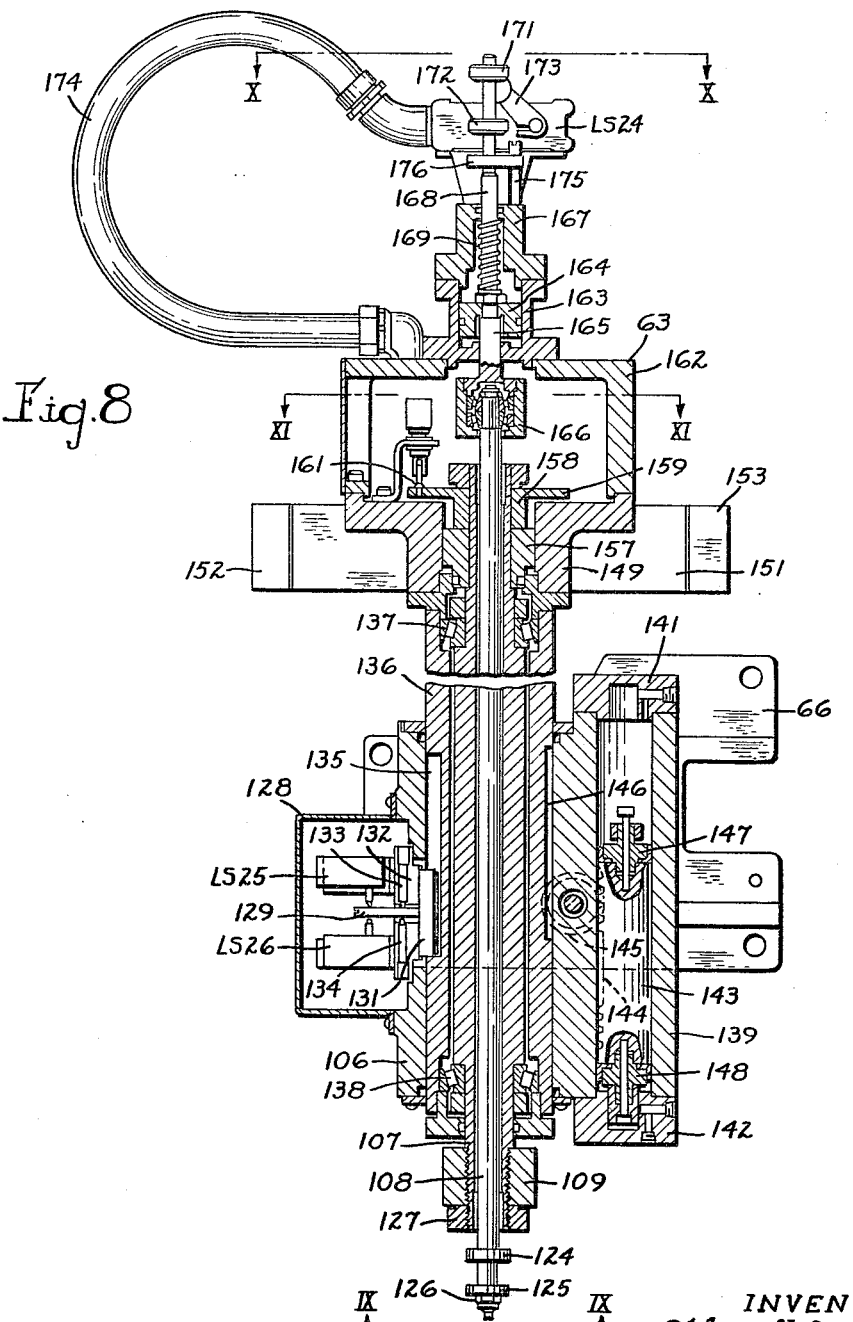
Figure 12:
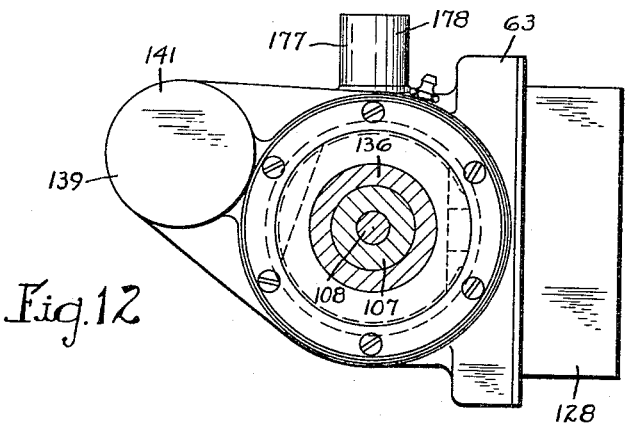
Figure 13:
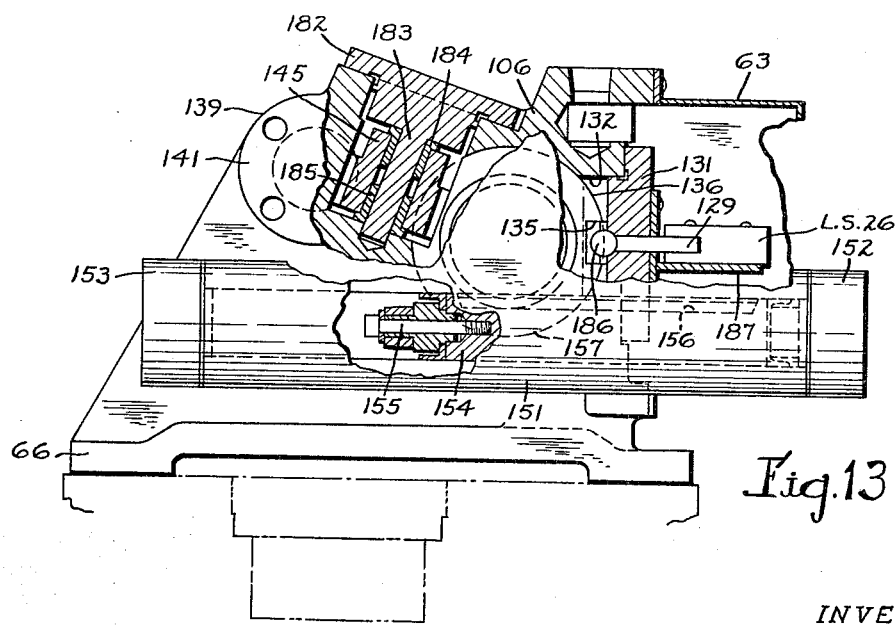

As is best evident in FIG. 13, the cylinder 151 is provided with a piston 154 which is suitably provided at one end with a shock-absorbing device 155. The piston 154 is formed on one side with a rack 156 which engages a pinion 157. This pinion is keyed to the upper end of the hollow shaft 107. In FIG. 8 it can be seen that overlying the pinion 157 is a member 158 which is keyed to the hollow shaft and which has an outwardly-extending flange 159. From the upper surface of the flange 159 extends a button 161 which engages, on occasion, one of three limit switches LS22, LS23, and LS21, as is best evident in FIG. 11. These switches are mounted by means of brackets on the top of the housing 149 and around them extends a hollow enclosure 162. Mounted on top of the enclosure 162 is a short vertical cylinder 163 carrying a piston 164. A piston rod 165 extends downwardly from the piston and is connected through an anti-friction coupling 166 to the upper end of the actuating rod 108. The top of the cylinder 163 is provided with a cylinder head 167 and another piston rod 168 extends upwardly from the piston 164 through this head. A coil spring 169 extends between the head 167 and the piston 164 to maintain the piston in a normal lower position. The upper end of the piston rod 168 is provided with two collars 171 and 172 which are in position to engage the actuating arm 173 of a limit switch LS24. A flexible electrical cable 174 extends from the switch LS24 down to the top of the enclosure 162. Extending upwardly from the cylinder head 167 is a vertical guide rod 175 and mounted on the piston rod 168 is a collar 176 which has a vertical bore in it to receive the rod 175 at some distance from the piston rod 168. The collar 176 and the rod 175 serve to key the piston 164 against turning.

Figure 7:
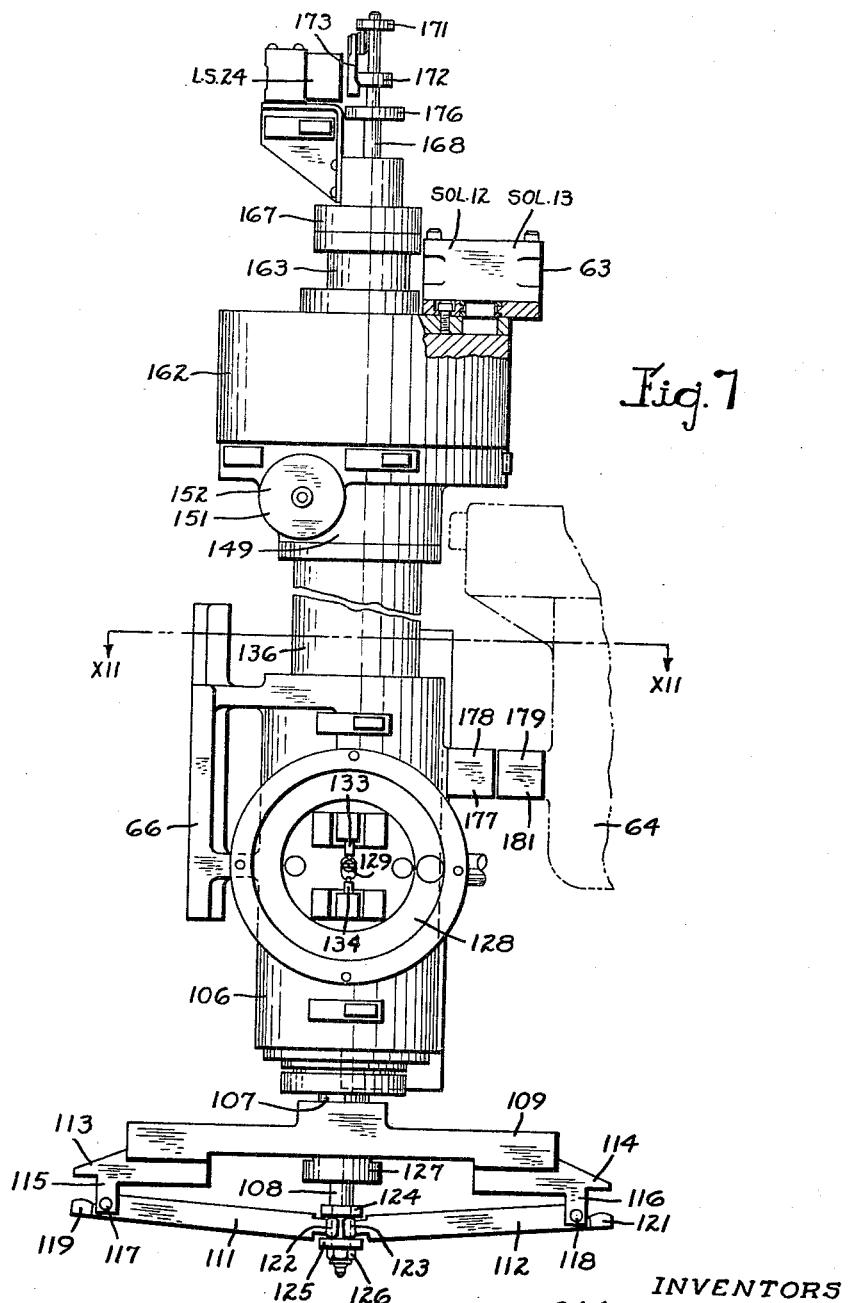

As is evident in FIG. 7, the housing 106 is provided with an abutment 177 having a flat finished upper surface 178. A similar surface 179 is provided on an abutment 181 associated with the presenter 64, as will be explained hereinafter. As is evident in FIGS. 7 and 10, there are mounted on top of the enclosure 162 the solenoids SOL 12 and SOL 13.

FIG. 13 shows particularly well the manner in which the pinion 145 is mounted in the housing 106. A plate 182 is mounted on the side of the housing and extending inwardly from the plate is a short shaft 183. It is on this shaft that the pinion 145 is mounted by means of bushings 184 and 185. FIG. 13 also shows the manner in which the control box 128 and its contents are related to the sleeve 136. The block 131 is freely slidable in a vertical direction in the slot 135 and a vertical rod 186 is carried in the recess 135 in the sleeve. The finger 129 overlies the switch LS26 which is carried on a bracket 187 fastened to the outer surface of the block 131.

PRESENTER

Figure 14:
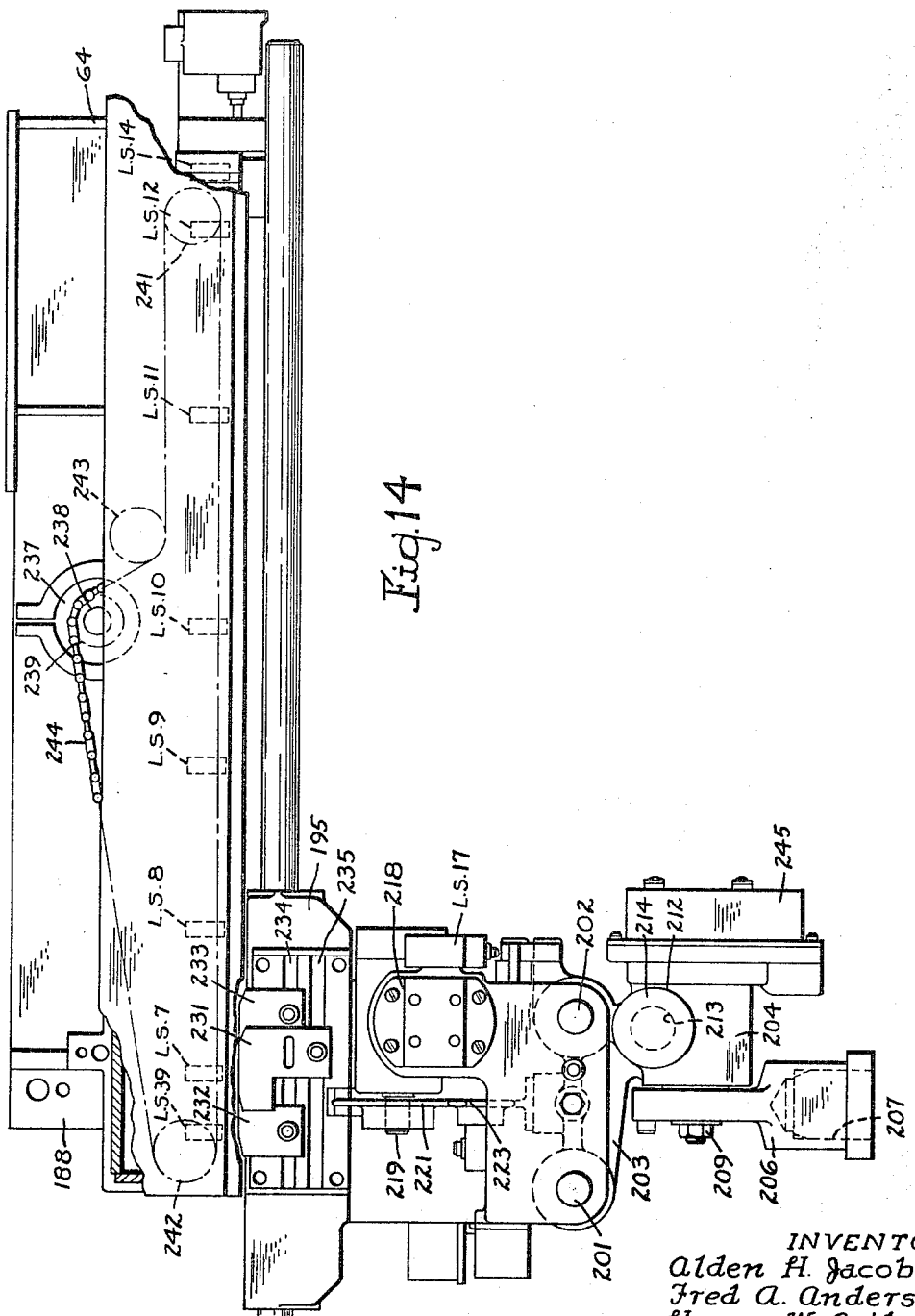
Figure 15:
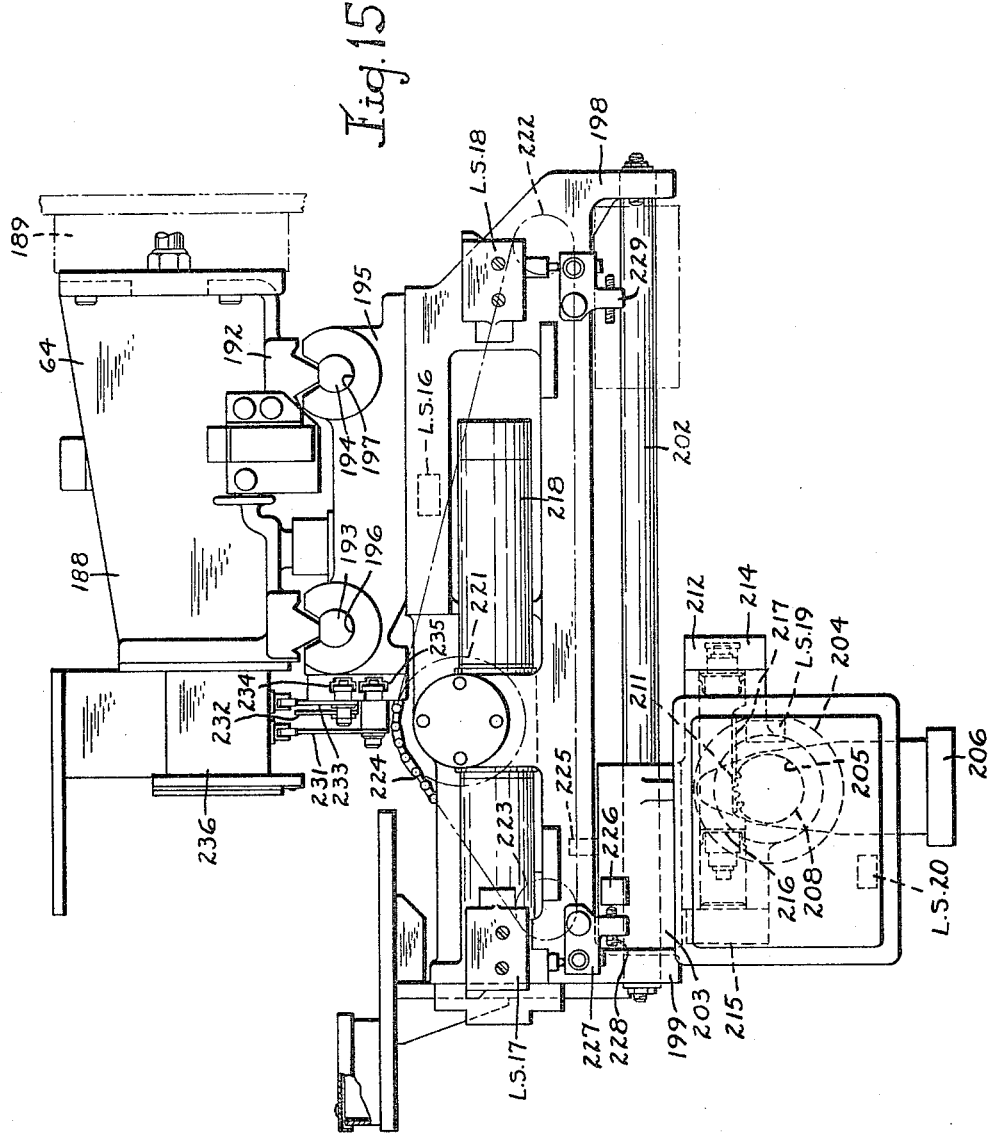
Figure 16:
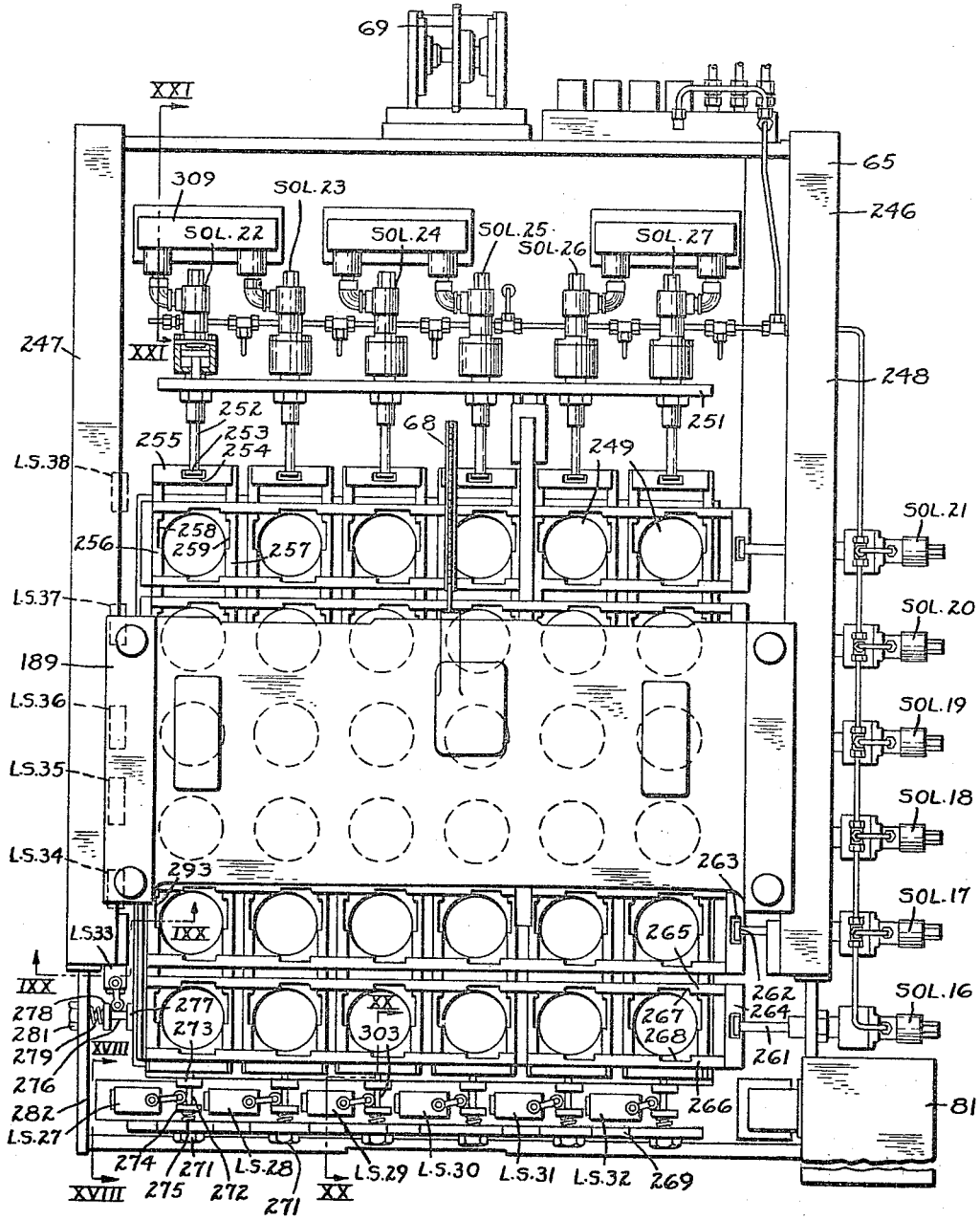

Referring to FIGS. 14 and 15, the presenter 64 is provided with a bracket 188 which extends across the front of the rack 65 and which is bolted to a rail 189, which extends across the rack from side to side, and which is carried at its ends in rails formed on the front of the main supporting structure of the tool changer. Extending downwardly from the bracket 188 are support members 191 and 192 which, in turn, support rod-shaped horizontal rails 193 and 194. A transport member 195 is suspended from the rails 193 and 194 by means of cylindrical grooves 196 and 197 formed in the upper portion thereof. From the rearward end of the transport member 195 depends a flange 198, while a similar flange 199 extends downwardly from the forward end of the transport member. Between these flanges extend two rod-like rails 201 and 202 which extend through suitable bores in a carrier 203. The carrier has a generally cylindrical boss 204 mounted in the lower portion thereof and provided with a transverse horizontal bore 205. At one side of the boss hangs a holder 206. The holder is provided with a socket adapted to receive and hold a tool holder, such as the tool holder 57. The holder is hingedly mounted by its connection to a shaft 208 which extends through the bore 205, the connection including a nut 209. Also mounted on the shaft 208 is a pinion 211 which is driven by a rack 217 formed on the side of a piston 216 which is slidable in a horizontal cylinder 212 mounted in the carrier 203. The cylinder is provided with heads 214 and 215. Mounted on the transport member 195 is a horizontal cylinder 218 driving a shaft 219 through a rack-and-pinion mechanism. Mounted on the shaft is a sprocket wheel 221 which drives a chain 224 extending around idler sprockets 222 and 223. The intermediate portion of the chain is connected to an abutment 225 on the carrier 203 so that it is caused to move forwardly and backwardly in response to a similar movement of the piston in the cylinder 218. The carrier 203 is also provided with a lateral abutment 226 which is in position to strike a pivoted stop 227 bolted to the transport member 195 at the forward portion thereof and having an adjustable screw 228 for adjustment of the striking position. At the rear end of the transport member 195 is located a pivoted arm 229 having a finger arranged to be engaged, on occasion, by the abutment 226.

Mounted on the front of the transport member 195 is a series of switch-engaging cams 231, 232, and 233. These cams are suitably carried in horizontal slots 234 and 235 formed in the front of the transport member and are adjustable relative to one another and relative to the transport member by means of bolts riding in the slots. Mounted on the front of the bracket 188 and extending transversely over the cams 231, 232, and 233 is a switch box 236. Mounted in this box with their actuating members hanging downwardly in position to be engaged by the cams is a number of limit switches LS7, LS8, LS9, LS10, LS11, and LS12. In addition, there is a microswitch LS39 at the left-hand side and a switch LS14 located at the right-hand side. Mounted in the central portion of the bracket 188 is a hydraulic motor 237 carrying on its shaft 238 a sprocket wheel 239. At the right-hand end of the bracket 188 is a sprocket 241, while a similar sprocket 242 is located at the left-hand end. Furthermore, an idler sprocket 243 is located to the right and slightly below the sprocket wheel 239. Over these four sprockets 239, 241, 242, and 243 extends a sprocket chain 244.

Located at the right-hand end of the boss 204 of the carrier 203 is a switch box 245 containing limit switches, including a presenter arm "UP" switch LS19 and a presenter arm "DOWN" switch LS20. Located at the rear of the transport member 195 is a switch LS18, while at the front is mounted a switch LS17. The actuating member of the switch LS18 is in position to be engaged by the pivoted arm 229, while the switch LS17 is in position to be engaged by the pivoted arm 227. A horizontal locator "EXTENDED" switch LS16 is in the central portion of the intermediate part of the transport member 195 below and between the rails 193 and 194.

RACK

FIGS. 16 through 22 show the details of the rack 65 which (in FIG. 16) is shown as a generally square-shaped vertical plate 246 having guide rails 247 and 248 extending vertically along the sides thereof. These rails support and guide presenter carrier 189 which carries the presenter (see FIG. 15). The plate is vertically slidable over the main supporting structure 67 in a manner that will be described more fully hereinafter. The plate 246 is indicated as having thirty-six circular apertures 249 arranged in horizontal and vertical rows of six apertures each. Each aperture is sized and arranged to receive a tool holder with a tool locked in place on it. Along the top of the plate is fastened a shelf 251 on which are mounted the solenoids SOL 22, SOL 23, SOL 24, SOL 25, SOL 26, and SOL 27, each overlying a vertical row of apertures 249. Solenoid SOL 22 has a cylinder with an actuating rod 252 provided with an enlarged head 253. This head resides in a T-slot 254 formed on a locking bar 255. The locking bar is provided with two vertical legs 256 and 257 which extend downwardly on either side of the particular vertical row of apertures 249 which the solenoid 22 overlies. The leg 256 is provided with a rectangular notch 258 while the leg 257 is provided with a similar notch 259. These notches are exactly opposed and, when the locking bar is in a downward position (i.e., when the solenoid 22 is energized), the notches lie on the horizontal centerline of the aperture of their corresponding aperture 249. In the raised position shown in FIG. 16, however, the notches are raised and a solid unnotched portion of each of the legs 256 and 257 extends into the area of the aperture, thus locking a tool holder in place. The rest of the notches in the legs 256 and 257 are similarly located relative to their respective apertures 249 so that, when the solenoid 22 is not energized, it is impossible to withdraw a tool holder from any of the apertures in that vertical row. The solenoids SOL 23, SOL 24, SOL 25, SOL 26, and SOL 27 are similarly connected to locking bars associated with the vertical row of apertures 249 which they overlie. Mounted along the right-hand side of the plate 246 is a row of solenoids SOL 16, SOL 17, SOL 18, SOL 19, SOL 20, and SOL 21, each one aligned with a horizontal row of apertures 249. The solenoid SOL 16 is provided with a cylinder having a plunger rod 261 with an enlarged head 262 engaging a T-slot 263 formed in a locking bar 264. This locking bar is provided with two horizontally-extending legs 265 and 266 which extend above and below, respectively, their row of apertures 249. The leg 265 is provided with a downwardly-directed rectangular notch 267, while the leg 266 is similarly provided with an upwardly-directed rectangular notch 268. When the solenoid 16 is not energized, the legs 265 and 266 are drawn to the right and a portion of each of the legs 265 and 266 extends into the area of the circular aperture 249, thus locking a tool holder in place. The legs are similarly provided with a set of notches opposite each of the apertures.

A shelf 269 extends along the bottom of the plate 246 and it is provided with a plurality of upwardly-directed sockets 271 each underlying and in line with the rod of one of the upper row of solenoids. The locking bar 255 associated with the solenoid SOL 22 is provided at its lower end with a vertical central rod 272 which is furnished with two collars 273 and 274. Underlying the collar 274 is a spring 275 held by the socket 271 and tending to keep the locking bar 255 raised in a vertical direction. Located beside the rod 272 with its actuating finger lying between the collars 273 and 274 is a limit switch LS27. Other limit switches LS28, LS29, LS30, LS31, and LS32 are arranged in a horizontal row each underlying, respectively, the solenoids SOL 23, SOL 24, SOL 25, SOL 26, and SOL 27. The left-hand end of the locking bar 264 is provided with a rod 276 which is provided with spaced collars 277 and 278. The rod 276 and the collar 278 are pressed by a coil spring 279 which is retained in a socket 281 which, in turn, is mounted on a bar 282 which extends vertically up the side of the plate 246. Lying between the collars 277 and 278 adjacent the rod 276 is the actuating finger of a limit switch LS33. Similarly located on the plate in a vertical row above the limit switch LS33 are five other limit switches LS34, LS35, LS36, LS37 and LS38 which, are arranged, respectively, in line with the actuating rods of the solenoids SOL 17, SOL 18, SOL 19, SOL 20, and SOL 21, respectively. All of these other limit switches, of course, are arranged to be actuated by suitable collars and rods associated with their respective locking bars of their own horizontal row of apertures 249.

FIG. 17 shows the side view of the apparatus showing the manner in which the six sockets 281 and its similar sockets are arranged along the side of the rail 247. Similarly, it shows the manner in which the solenoid SOL 22 is mounted on the shelf 251 and the manner in which its rod 252 extends vertically to engage the locking bar 255.

In FIG. 22 are shown the set of rails 283 and 284 by which the rack 65 is vertically slidably arranged on the main supporting structure 67 of the machine. A shelf 285 is located in the central upper portion of the plate 246 to support the sprocket wheel 69 which carries the sprocket chain 68; the chain pulls the rail 189 up and down to move the presenter carrier 64. Also shown is the manner in which the uppermost horizontal locking rod is provided with a rod 286 located at the end opposite the solenoid SOL 21, the rod having collars 287 and 288 which engage the limit switch LS38 (not shown). It shows the location of a socket 289 carrying a coil spring 291 which engages the left-hand end of the locking bar at the collar 288. This spring pressure causes the locking collar to occupy a right-hand position to lock the tool holders in place in the apertures 249 when the solenoid is not energized. This view also shows the location of the solenoids SOL 22, SOL 23, SOL 24, SOL 25, SOL 26, and SOL 27.

FIG. 18 shows a detail of the corner construction of the rack with the plate 246 having an additional plate 292 mounted on its surface to carry the limit switches LS27 et al. It also shows the arrangement of the shelf 269 with its sockets 271.

FIG. 19 shows a view of the rack as observed from below, showing the plate 246 with one of the apertures 249 and a section of the leg 256 overlying it with one of the notches 293 showing the relationship of the inner edge 294 of the locking bar and the bottom 295 of the notch to the periphery of the aperture 249. This portion of the drawing also shows particularly well the manner in which the rod 276 and its collars 277 and 278 are connected to the locking bar 264 with its notch 296. Also illustrated is the socket 281 carrying the coil spring 279.

FIG. 20 shows some of the details of the vertical rows of apertures showing the horizontal locking bar 264 lying immediately adjacent the face of the plate 246 and the aperture 249 with a notch 297 related to the edge of the aperture. This view shows a vertical locking bar 298 and the manner in which a notch 299 is provided to permit the lateral movement of the locking bar 294 through it. The locking bar is also provided with a notch to permit the locking bar 298 to move vertically relative to it, the dotted line 301 representing the engaging surfaces between the notches in the two locking bars wherein they slide relative to one another. As is evident in the drawing, the locking bar is provided with a cross-bar 302 from which depends a rod 303 carrying collars 304 and 305 in position to engage the actuating finger 306 of the limit switch LS29. A socket 307 is shown mounted in the shelf 269 and holding the spring 308 in place.

FIG. 21 shows a section through a terminal box 309 located at the top of the rack and used to bring the electrical leads into the solenoids SOL 22, and SOL 23. The box contains the terminal strips 311 and the fitting 312 leading to the solenoid SOL 22.

PRESENTER STOP

Figure 23:
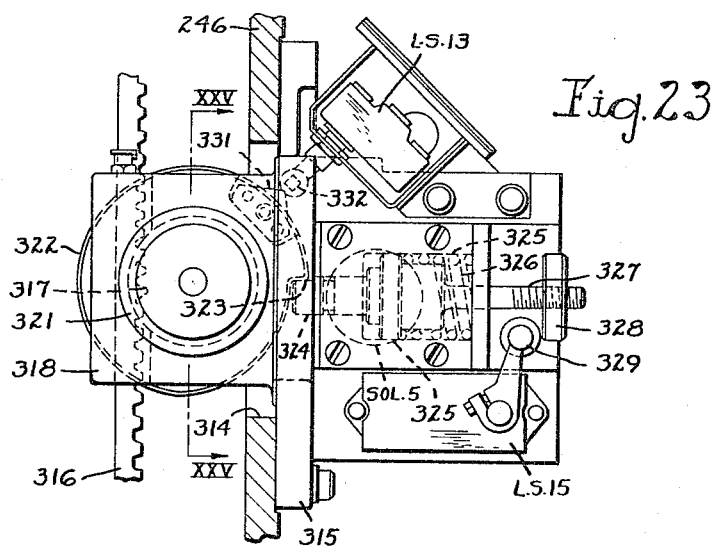
Figure 24:
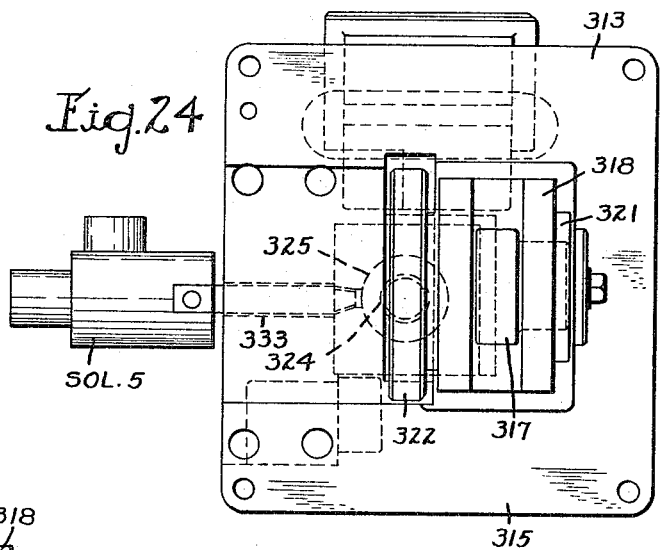
Figure 25:
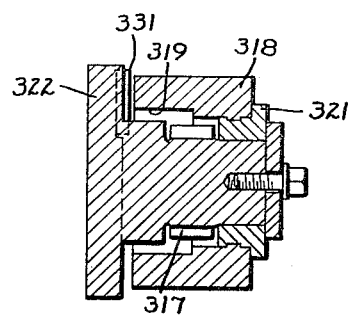

FIGS. 23, 24, and 25 show the details of the presenter stop 313 (see FIG. 2 for general location). The plate 246 of the rack 65 is provided in its upper portion with an opening 314 and the presenter stop is provided with a flange 315 by which it is bolted to the plate around this opening with a portion extending forwardly of the plate and a portion remaining to the rear. The rail 189 on which the presenter 64 is mounted has bolted on its rearward surface a rack 316 which engages a pinion 317 mounted in the presenter stop forwardly of the plate 246. The presenter stop has an abutment 318 which extends forwardly of the plate 249 and which has a horizontal bore 319 extending therethrough. The bore carries a bushing 321 which carries the pinion 317. The pinion 317 is built with an integral body that extends out of the bore 319 and on the outboard end is provided with an enlarged cam 322 having a drop-off point or shoulder 323. The periphery of the cam 322 extends throughout the housing of the presenter stop 313 well to the rear of the plate 249. At that point, it engages a plunger 324 having a piston 325 which is slidable longitudinally in a bore 325 and which is biased in the forward direction by a coil spring 326. At the rearward end a rod 327 extends from the piston 325, and this is provided with an adjustable collar 328. The collar is in the path of the finger 329 of a limit switch LS15. Bolted on the side of the cam 322 is an abutment 331 which, on occasion, engages the actuating finger 332 of a limit switch LS13. The solenoid valve SOL 5 is mounted on the rear of the plate 249 beside the presenter stop 313 and a passage 333 extends from its valve into the forward end of the bore 325.

RACK ADJUSTING CYLINDER

Figure 28:
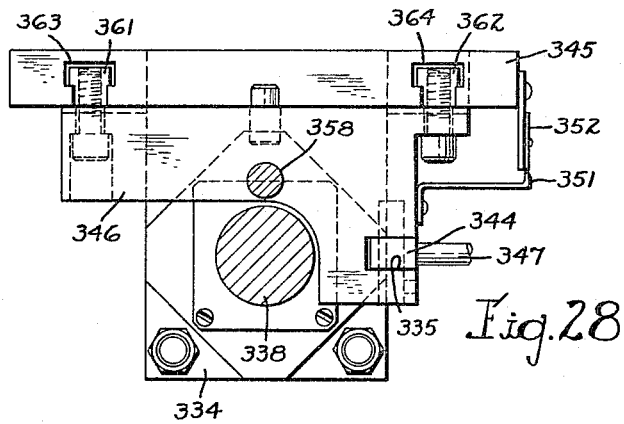

FIGS. 26, 27, and 28 show the details of the rack adjusting cylinder 74 (see FIG. 2 for general location). This apparatus is provided with a cylinder 334 having cylinder heads 335 and 336. The heads are bolted to the forward surface of the main supporting structure 67. A piston 337 is slidable in the bore of the cylinder 334 and is provided with an upwardly-extending piston rod 338. At its upper end, the rod is provided with a head 339 which engages and is connected to the bottom of the rack 65. A collar 341 surrounds an intermediate portion of the rod 338 and is provided with a laterally-extending finger 342 having a flat, horizontal upper surface. Associated with the collar 341 and its finger 342 is a latching mechanism 343 having a latching finger 344 with a downwardly-directed horizontal surface adapted to engage, on occasion, an upwardly-directed horizontal surface of the finger 342. The latching mechanism 343 is also provided with a track 345 which is bolted to the forward surface of the main supporting structure 67. There is a latching housing 346 slidable in the track 345 and provided with a finger-operating handle 347. The latching finger 344 is hingedly mounted in the housing 346 and is spring-biased toward the rod 338. The upper end of the finger is provided with an upwardly-inclined surface 348, while the finger 342 is provided with a downwardly-inclined surface 349 whereby, in moving upwardly as the piston moves downwardly, the finger 344 can swing away from the finger 342; in moving in the other direction, of course, the two flat, horizontal surfaces engage and prevent movement. Mounted on the housing 346 is a pointer 351 which slides over a scale 352 mounted at the side of the track 345. The side of the block 346 is provided with a slot 353 in which are hingedly mounted the handle 347 and the finger 344. The finger is hinged on a horizontal pivot pin 354 and is biased to an inner position over the finger 342 by a spring 355. The handle 347 is mounted on a pivot pin 356 and when operated, its inner end engages an inclined surface on the finger 344 and pivots in a clockwise direction (as observed in FIG. 26) to dis-engage it from the finger 342. The rear of the collar 341 is provided with a downwardly-extending stop pin 357 having an accurately formed horizontal surface, while the top of the block 346 is provided with a similar mating pin 358 having an accurately formed horizontal surface to match that of the pin 356. The cylinder head 334 is provided with an oil port 359 by which it is connected to the valves 78 and 109 (see FIGS. 3 and 6). In FIG. 28 it can be seen that the block 346 slides on the track 345 by means of T-bolts 361 and 362 sliding in T-slots 363 and 364, respectively. There are four of these bolts residing in the two T-slots 363 and 364 and by loosening them it is possible to re-position the block.

TOOL HOLDER

Figure 29:
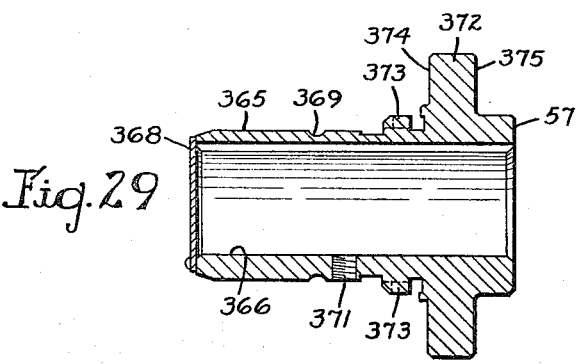
Figure 30:
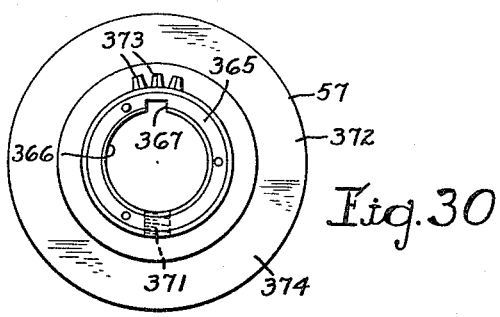

FIGS. 29 and 30 show the details of the tool holder 57. It consists of a generally cylindrical body 365 through which extends an axial bore 366 which is formed with a longitudinal keyway 367. To one of the bodies 365 is fastened an identification tag 368 (which is shown removed in FIG. 30) which may be formed of plastic or the like. In the intermediate portion of the body is provided a semi-circular groove 369; this groove is intended to receive a ball detent in the interior of the socket of the presenter arm 206, so that the tool holder will be held in place during transporting. Beside the groove is provided a threaded radial aperture 371 which is adapted to receive a set screw to hold a tool in place in the tool holder. Close to the end of the main body opposite the tag 368 is an outwardly-extending flange 372 having parallel, spaced, radial surfaces 373 and 374. Extending outwardly of the main body between the flange 372 and the threaded aperture 371 is a ring of gear teeth 373. As is evident in FIG. 30, these teeth have a conventional gear tooth profile. However, at the edge of the teeth facing toward the groove 369 they are provided with inclined surfaces or points. When the tool holder is inserted in the socket in the spindle 56, the socket is provided with mating gear teeth and the pointed ends of the teeth 373 permit the tool holder very quickly to gain admittance between the teeth in the spindle, irrespective of their angular relationship.

HYDRAULIC COUNTERBALANCE

Figure 37:
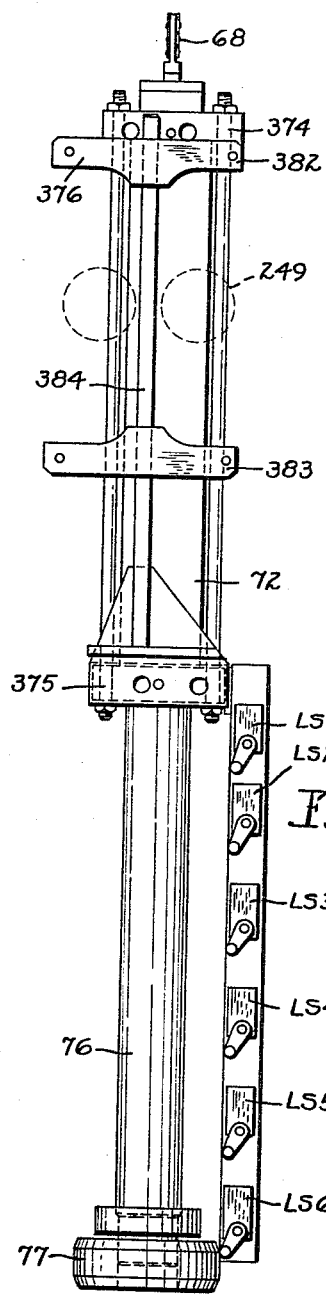
FIG. 37 is a back elevational view of a hydraulic counter-weight.
Figure 38:
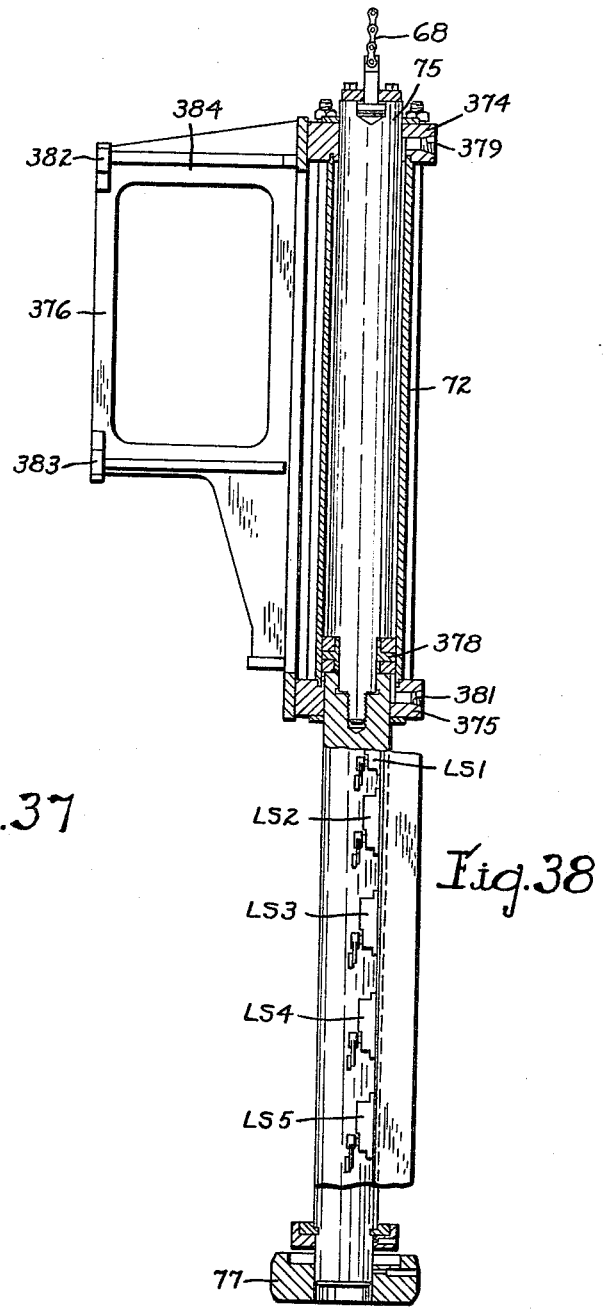
FIG. 38 is a side elevational view of the hydraulic counter-weight.

FIGS. 37 and 38 show the details of the hydraulic counterbalance 72. As has been described above, the counterbalance is provided with hydraulic cylinder from which extends an upper piston rod 75, while at the other end the piston rod is provided with a lower piston rod 76 on which is formed a head 77. The cylinder is provided with an upper cylinder head 374 and a lower cylinder head 375, both of which are fastened to a bracket 376 which is bolted to the rear surface of the main supporting structure 67 of the machine. From the end of the piston rod 75 extends the sprocket chain 68 by which the presenter mechanism is moved up and down. Arranged beside the cylinder in the path taken by the head 77 as it moves up and down with the piston rod 76 are limit switches LS1, LS2, LS3, LS4, LS5, and LS6, the head 77 being formed with beveled surfaces to approach and engage the actuating fingers of the limit switches without damage thereto. As is evident in FIG. 38, the piston rod 75 and the piston rod 76 are two separate members which are joined together at their ends to form an elongated member and piston rings 378 are held between the two separable parts to form the piston proper within the cylinder 72. The hydraulic port 379 is provided in the head 378 to admit oil to the top of the cylinder, while a similar threaded hydraulic port 381 is provided in the cylinder head 375 to admit oil to the bottom of the cylinder below the piston rings 378. It is interesting to note that the bracket 376 is constructed with two horizontal legs 382 and 383 joined by a web 384, and the arrangement is such that there is no interference between the bracket and the rows of tools and tool holders residing in the apertures 249. In other words, the tool holders and tools protrude from the apertures without striking any part of the hydraulic counter-weight cylinder 72 and its associated parts.

HYDRAULIC AND PNEUMATIC CIRCUITRY

Figure 31:
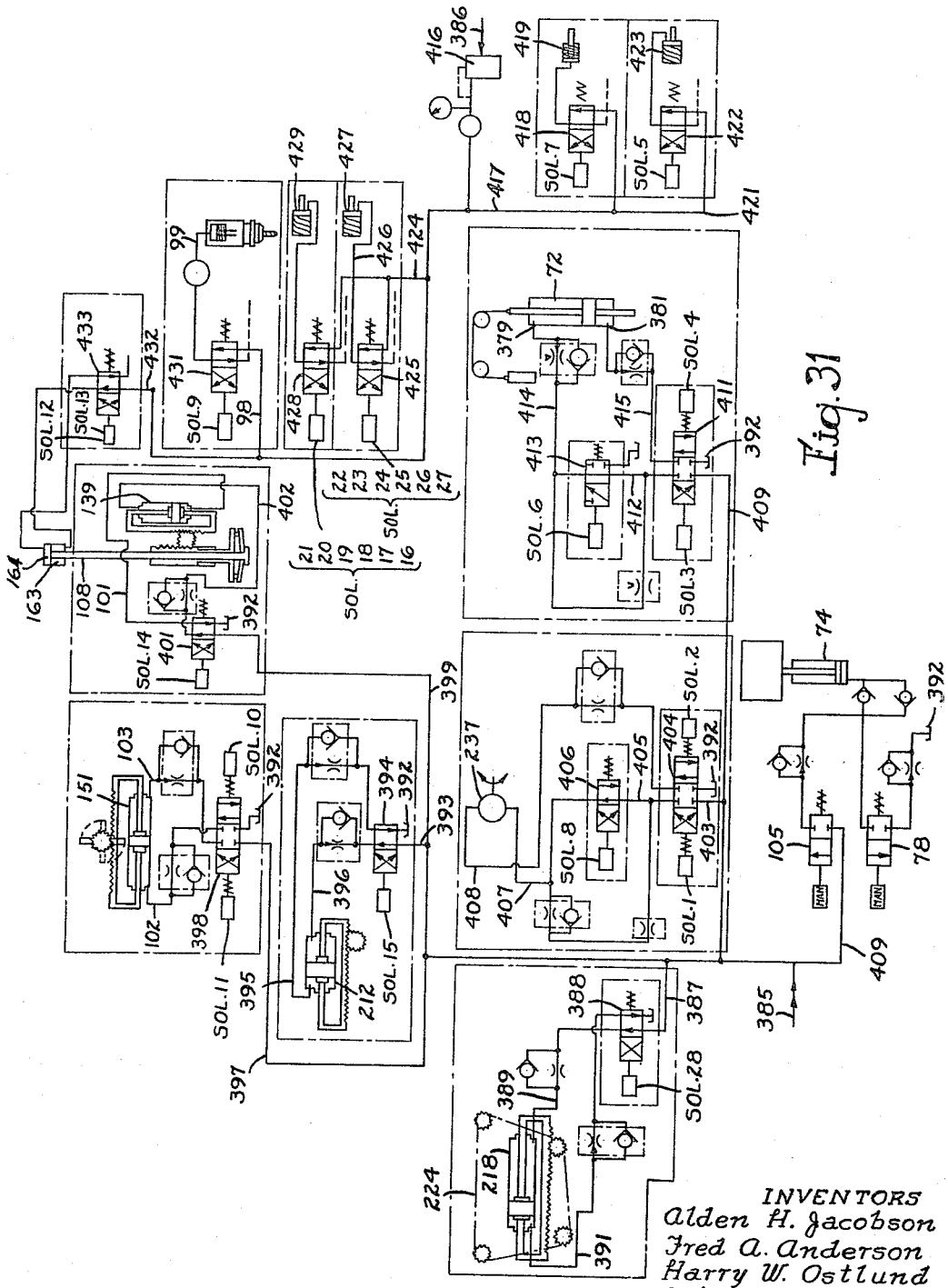

FIG. 31 shows the details of the hydraulic and pneumatic circuitry along with the connections between the various parts. Hydraulic pressure enters the system through a supply line 385, while the pressure air supply enters through an airline 386. From the oil supply line extends a line 387 to one side of a four-way spring offset solenoid valve 388 operated by solenoid SOL 28 (see FIG. 6). The other side of the valve 388 is connected by a line 389 to one end of the presenter cylinder 218. This is the cylinder which moves the tool holder toward and away from the rack and can be seen in FIG. 15. A line 391 leaves the other end of the cylinder and leaves through the other part of the valve to the sump 392. The valve 388, of course, operates to reverse the pressure and sump connections to the cylinder 218 to cause it to reciprocate and, in turn, drive the sprocket chain 224 to cause the carrier 203 to move toward and away from the rack with the tool holder and tool.

The hydraulic pressure oil supply line 385 is also connected by a line 393 to a four-way spring offset valve 394 which is operated by the solenoid SOL 15 (see FIG. 6). This valve is connected by lines 395 and 396 to the opposite ends of the presenter arm "UP AND DOWN" cylinder 212 (see FIGS. 14 and 15). The valve 394 has the function of alternately connecting pressure oil and the sump 392 to the opposite ends of the cylinder 212 to bring about rotation of the holder 206 of the presenter.

The pressure oil line 385 is also connected by a line 397 to a four-way closed-center spring-centered valve 398 which is operated in opposite directions by the solenoids SOL 10 and SOL 11 and which is connected by lines 102 and 103 to the interchange arm rotary cylinder 151 (see FIGS. 8 and 10). The valve 398 has the effect of connecting the ends of the cylinder 151 alternately to pressure oil and to the sump 392.

The pressure oil line 385 is also connected by a line 399 to the interchange arm "UP AND DOWN" motion circuitry including a four-way spring-offset valve 401 which is operated by the solenoid SOL 14 (see FIG. 6). The valve is connected by lines 101 and 402 to the up-and-down cylinder 139 of the interchanger 63 (see FIG. 8). The valve 401 operates to connect the ends of the cylinder 139 alternately to pressure oil or to the sump 392.

The pressure oil line 385 is also connected by a line 403 to a four-way closed-center spring-centered valve 404. The other side of the valve is connected by a line 405 (see FIG. 6) to a four-way spring offset valve 406 used as a two-way valve and operated by the solenoid SOL 8. The output of the valve 406 is connected by a line 407 to one side of the presenter carriage horizontal-motion motor 237. The other side of the motor is connected by a line 408 directly to the valve 404 which operates to reverse the pressure fluid to the motor 237 and to connect the low pressure side of the motor to the sump 392.

The pressure oil line 385 is also connected by a line 409 through the manually-controlled "UP" valve 105 to the bottom of the rack-adjusting cylinder 74. The bottom of this cylinder is also connected through the manually-operated "DOWN" valve 78 to the sump 392.

The pressure oil line 385 is also connected by a line 409 to a four-way closed-center spring-centered valve 411 which is operated by the solenoids SOL 3 and SOL 4 (see FIG. 6). This valve is connected by a line 412 to a two-way spring-offset valve 413 which is operated by the solenoid SOL 6. The valve 413 is connected by a line 414 to the port 379 of the hydraulic counterweight cylinder 72. The bottom port 381 is connected by a line 415 directly back to the valve 411, the valve 411 operating to provide each opposite end of the cylinder 72 alternately with pressure oil or to connect it to the sump 392.

The air line 386 is connected through a pressure regulator 416 to a line 417 leading to a three-way valve 418 operated by the solenoid SOL 7. The other side of the valve 418 is connected to a horizontal locator 419 in the presenter mechanism. The pressure air line 386 is also connected by a line 421 to a three-way valve 422 operated by the solenoid SOL 5. This valve is, in turn, connected to a vertical locator 423. The pressure air line 386 is also connected by a line 424 to a series of three-way valves, represented in the drawing by the valve 425, operated by the valves SOL 22 through SOL 27 and connected by a line 426 to a vertical locking cylinder 427, one for each of the said solenoids. The same line 424 is connected to a series of three-way valves, such as the valve 428, all operated by the solenoids SOL 16 through SOL 21 and connected by a line 428 to one of the horizontal locking cylinders 429, each one associated with one of the said solenoids.

The pressure air line 386 is also connected by the line 98 to a three-way valve 431 operated by the solenoid SOL 9. The valve is connected by the line 99 to the chuck in the spindle 56 which clamps and unclamps the tool holder 57. Air pressure unclamps and a spring acts to clamp in the preferred embodiment of the invention.

The pressure air line 386 is also connected by a line 432 to a three-way valve 433 operated by the solenoids SOL 12 and SOL 13. The valve 433 is connected to the cylinder 163 which operates on the rod 108 to clamp and unclamp the interchanger, the valve 433 serving to present pressure at either the top or the bottom of the piston 164 to provide up and down motion of the rod 108 (see FIG. 8).

ELECTRICAL CIRCUITRY

Figure 32:
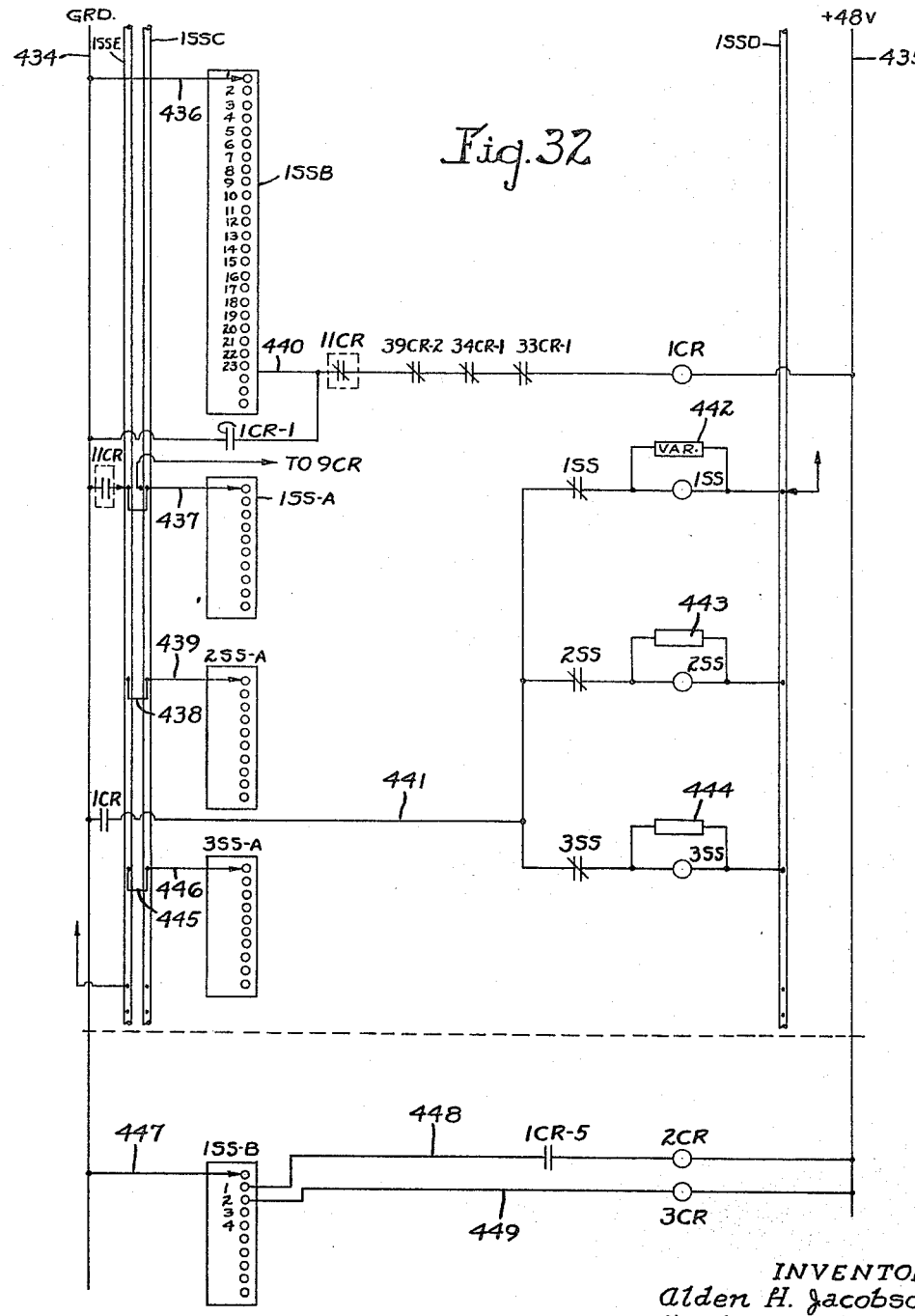

FIGS. 32 through 36 show the details of the electrical circuitry used in the present invention. FIG. 32 shows some of the elements in the control apparatus 43. A ground line 434 is provided and a 48-volt D.C. line 435. A line 436 is connected from the ground line 434 to the master stepper ISSB having 26 successive contact studs. A line 440 leaves the 23rd button of the master stepper ISSB and is connected to the power line 435 through a normally-closed contact 11CR, a normally-closed contact 39CR-2, a normally-closed contact 34CR-1, a normally-closed contact 33CR-1, and the coil of a relay 1CR, all in series. The line 436 is connected back through a normally-open contact 1CR-1 to the ground line 434. Extending through the apparatus are two parallel bus lines 1SSE and 1SSC. The normally-open contact 11CR is connected to the line 434 and to the bus line 1SSE, and then through a jumper to the bus line 1SSC, after which a connection is made to the relay 9CR. The connection on the bus line 1SSC is also connected by a line 437 to a stepping switch 1SSA. A jumper 438 extends across the bus lines 1SSE and 1SSC and is connected by a line 439 to a stepping switch 2SSA. A normally-open contact 1CR is connected on one side to the line 434; on the other side it is connected by a line 441 and by three circuits to a bus line 1SSD. First of all, the line 441 is connected through a normally-closed switch 1SS and the coil of the relay 1SS to the bus line 1SSD, there being a varistor 442 used as a surge suppressor connected across the relay coil 1SS. Secondly, the line 441 is connected through a normally-closed contact 2SS and through the coil of the relay 2SS to the bus line 1SSD and a varistor 443 is connected across the coil of the relay. Thirdly, the line 441 is connected through the normally-closed contact 3SS and through the coil of the relay 3SS to the bus line 1SSD, there being a varistor 444 connected across this coil. A jumper 445 is connected from the bus line 1SSE to the bus line 1SSC and then is connected through a line 446 to the stepping switch 3SSA. A line 447 is connected to a stepping switch 1SSB, the #1 stud of which is connected by a line 448 through a normally-open contact 1CR5 and through the coil of a relay 2CR to the line 435. The next lower stud (#2) of the stepping switch 1SSB is connected by a line 449 through the coil of a relay 3CR to the line 435.

Figure 33:
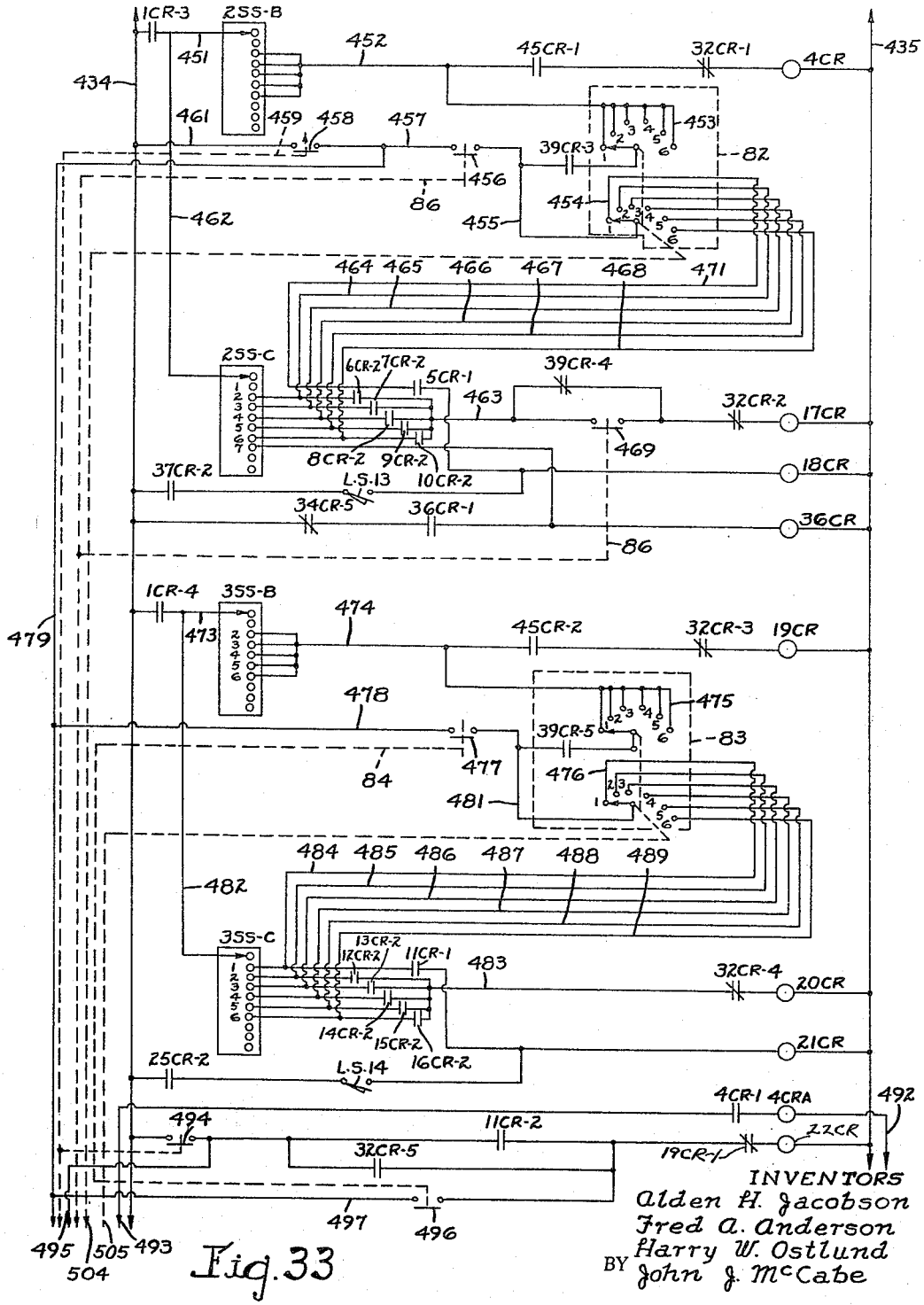

Referring now to FIG. 33, a normally-open contact 1CR3 is connected on one side to the ground line 434 and on the other side through a line 451 to a stepping switch 2SSB, the second, third, fourth, fifth, and sixth studs of which are connected by a line 452 through a normally-open contact 45CR-1, a normally-closed contact 32CR-1, and the coil of the relay 4CR to the 48-volt line 435. A point in the line 452 is connected to a selector switch 453. This switch operates in synchronization with a selector switch 454. An intermediate point on the electrical connection between the contact of the switches 453 and 454 is connected by a normally-open contact 39CR-3 to a line 455 leading to the contact of the switch 454. The switches 453 and 454 are component parts of the vertical lock selector switch 82 (see FIG. 5). The line 455 is connected to one side of a normally-open contact 456 of the presenter "UP AND DOWN" switch 86. The other side of this contact is connected by a line 457 to one side of a normally-open contact 458 of the changer "auto-manual" switch 459. The other side of the contact 458 is connected by a line 461 to the ground line 434. The line 451 between the normally-open contact 1CR-3 and the stepping switch 2SS-B is connected by a line 462 to a stepping switch 2SS-C. The #2 stud of the stepping switch 2SS-C is connected through a normally-open contact 6CR-2 to a common line 463. Similarly, stud #3 is connected through a normally-open contact 7CR-2 to the line 463. Stud #4 is connected through the normally-open contact 8CR-2 to the line 463. The stud #5 is connected through the normally-open contact 9CR-2 to the common line and the stud #6 is connected through the normally-open contact 10CR-2 to the line 463. Stud #2 of the stepping switch is connected by a line 464 to the #2 contact of the switch 454, the #3 stud is connected by a line 465 to the #3 contact of the switch 454, the #4 contact of the selector switch is connected by a line 466 to the #4 contact of the switch 454, the #5 stud is connected by a line 467 to the #5 contact of the switch 454, and the #6 stud is connected by a line 468 to the contact #6 of the switch 454. The line 463 is connected through a normally-closed contact 39CR-4, a normally-closed contact 32CR-2, and the coil of the relay 17CR to the power line 435. At the same time, a normally-open contact 469 of the presenter switch 86 is connected across the normally-closed contact 39CR-4. The #1 contact of the switch 454 is connected by a line 471 through a normally-open contact 5CR-1 and through the coil of a relay 18CR to the high voltage line 435. A point on the connection between the normally-open contact 5CR-1 and the coil of the relay 18CR is connected through a limit switch LS13 and a normally-open contact 37CR-2 to the ground line 434. A normally-closed contact 34CR-5 is connected on one side to the line 434 and on the other side to a normally-open contact 36CR-1, the other side of which is connected through the coil of a relay 36CR to the high voltage line 435. A common point betwen the normally-open contact 36CR and the coil of the relay 36CR is connected by a line 472 to the #7 stud of the stepping switch 2SS-C.

One side of a normally-open contact 1CR-4 is connected to the ground line 434 and the other side is connected through a line 473 to a stepping switch 3SS-B. The #2, 3, 4, 5, and 6 studs of this stepping switch are connected to a common line 474 which, in turn, is connected through a normally-open contact 45CR-2, a normally-closed contact 32CR-3, and the coil of a relay 19CR to the high voltage line 435. The line 474 is connected to all of the contacts of a selector switch 475 whose contact finger is mechanically connected to the contact finger of a similar six-position selector switch 476. The switches 475 and 476 are parts of the horizontal lock selector switch 83 in the control box 81 (see FIG. 5). The selector fingers of the switches 475 and 476 are mechanically joined together and also connected electrically through a normally-open contact 39CR-5 to one side of an open contact 477 forming part of the presenter "LEFT-RIGHT" switch 84. The other side of the contact 477 is connected by a line 478 to a line 479 leading back to a point in the line 475 between the contact 458 of the switch 459 and the contact 457 of the switch 86. A line 481 extends from the contact finger of the selector switch 476 to a point between the normally-open contact 39CR-5 and the contact 477 of the switch 84. The line 473 associated with the stepping switch bank 3SS-B is also connected by a line 482 to the stepping switch 3SS-C.

Studs #2, 3, 4, 5, and 6 of the stepping switch 3SS-C are connected, respectively, through normally-open contact 12CR-2, normally-open contact 13CR-2, normally-open contact 14CR-2, normally-open contact 15CR-2, and normally-open contact 16CR-2 to a common line 483. Stud #1 is connected through a normally-open contact 11CR-1, and through the coil of a relay 21CR to the hot line 435. Stud #1 is also connected by a line 484 to contact #1 of the switch 476. Stud #2 is connected by a line 485 to contact #2 of the switch 476. Stud #3 is connected by a line 486 to contact #3 of the switch. Stud #4 is connected through a line 487 to contact #4 of the switch. Stud #5 of the stepping switch 3SS-C is connected by a line 488 to contact #5 of the switch 476. Stud #6 is connected by a line 489 to contact #9 of the switch 476. A point between the normally-open contact 11CR-1 and the coil of the relay 21CR is connected back through the limit switch LS14 and a normally-open contact 25CR-2 to the ground line 434. Line 483 is connected through a normally-closed contact 32CR-4 and the coil of a relay 20CR to the line 435. Power lines 492 and 493 carry 110-volt 60-cycle alternating current electricity and a normally-open contact 4CR-1 and the coil of the relay 4CRA are connected in series between them. A normally-open contact 494 is connected on one side to the ground line 434; the contactor 494 is part of the switch 459. A line 495 is connected to the other side of the contact 494. The other side of this contact is also connected through a normally-open contact 11CR–2, a normally-closed contact 19CR–1, and the coil of a relay 22CR to the hot line 435. In addition, a normally-open contact 32CR–5 extends around the normally-open contact 11CR–2. An open contact 496 is connected on one side to a common point between the normally-open contact 11CR–2 and the normally-closed contact 19CR–1. The other side of this switch 496 is connected by a line 497 to the line 479 which, as has been stated above, is connected to a common point between the contacts 458 and 456 and also is connected by the line 478 to one side of the contact 477 of the switch 84. The contact 496 and the contact 477 are mechanically connected together as parts of the switch 84.

Figure 34:
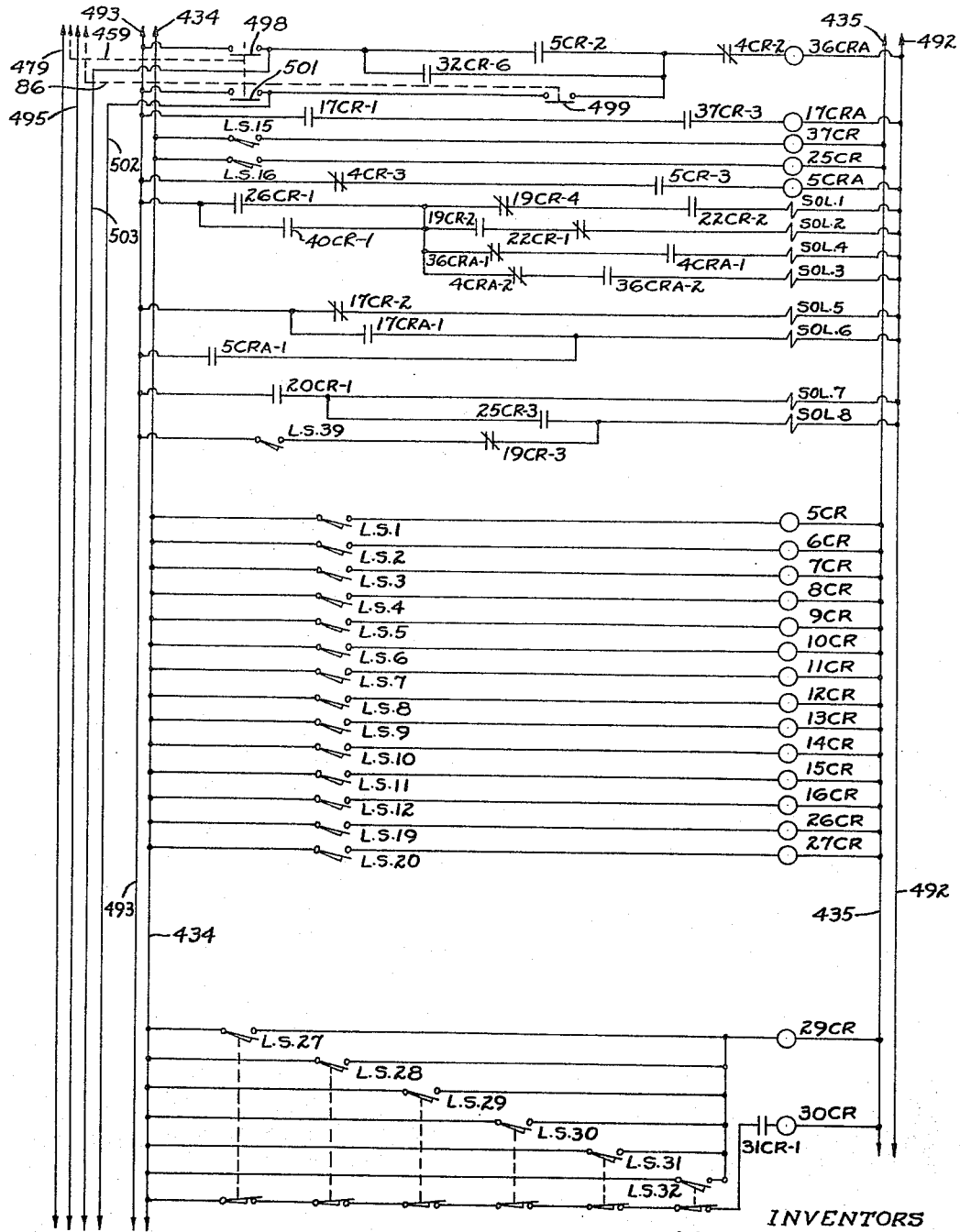

Referring next to FIG. 34, an open contact 498 is connected on one side to the line 493 which, it will be recalled, is the hot side of the 110 volt power line. The contact is mechanically connected into the switch 459 and its other side is connected through a normally-open contact 5CR–2, a normally-closed contact 4CR–2, and the coil of a relay 36CRA to the ground line 492 of the 110 volt system. In addition, a normally-open contact 32CR–6 is connected around the normally-open contact 5CR–2. A common point between the normally-open contact 5CR–2 and the normally-closed contact 4CR–2 is connected back through an open contact 499 and a normally-open contact 501 to the line 493. A line 503 is connected on a common point between the contact 498 and the normally-open contact 5CR–2. The contact 501 is mechanically connected to the switch 459 along with the contact 498. The contact 499 is mechanically connected to the switch 86. The side of the contact 501 which is shared in common with the contact 499 has connected thereto a line 502.

The line 493 is connected through a normally-open contact 17CR–1 and a normally-open contact 37CR–3 and the coil of a relay 17CRA to the line 492. The line 434 is connected through the limit switch LS15 and the coil of a relay 37CR to the line 435. The line 434 is also connected through the limit switch LS16 and the coil of the relay 25CR to the line 435. The line 493 is connected through a normally-closed contact 4CR–3, a normally-open contact 5CR–3 and the coil of a relay 5CRA to the line 492. The line 493 is also connected through a normally-open contact 26CR–1, a normally-closed contact 19CR–4, a normally-open contact 22CR–2, and the solenoid SOL 1 to the line 492. A normally-open contact 40CR–1 is connected around the normally-open contact 26CR–1. In addition, a common point between the normally-open contact 26CR–1 and the normally-closed contact 19CR–4 is connected through a normally-open contact 19CR–2, a normally-closed contact 22CR–1, and the solenoid SOL 2 to the line 492. In addition, the same common point is connected through a normally-closed contact 36CRA–1, a normally-open contact 4CRA–1, and the solenoid SOL 4 to the line 492. In addition, this same common point is connected through a normally-closed contact 4CRA–2, a normally-open contact 36CRA–2, and the solenoid SOL 3 to the line 492.

The line 493 is connected through a normally-closed contact 17CR–2 and the solenoid SOL 5 to the line 492. The line 493 is also connected through a normally-open contact 17CRA–1 and the solenoid SOL 6 to the line 492. A common point between the normally-open contact 17CRA–1 and the solenoid SOL 6 is connected back through a normally-open contact 5CRA–1 to the line 493.

The line 493 is connected through a normally-open contact 20CR–1 and the solenoid SOL 7 to the line 492. A common point between the normally-open contact 20CR–1 and the solenoid SOL 7 is connected through a normally-open contact 25CR–3 and the solenoid SOL 8 to the line 492. A common point between the normally-open contact 25CR–3 and the solenoid SOL 8 is connected back through a normally-closed contact 19CR–3 and the limit switch LS39 in series to the line 493.

A number of limit switches are connected in series with the coils of several relays from the line 434 to the line 435. As is evident in the drawing, the limit switches 27, 28, 29, 30, 31, and 32 are formed in two switch portions mechanically connected together. That is to say, each limit switch consists of two switch sections which operate together. For instance, one portion of the limit switch LS27 is connected on one side to the line 434, while the other side is connected through the coil of a relay 29CR to the line 435. Similarly, the first portions of all of the other limit switches LS28, 29, 30, 31, and 32 are connected on one side to the line 434 and on the other side through the coil of the relay 29CR to the line 435. The second portions of each of these switches, however, are all connected in series from the line 434 through a normally-open contact 31CR–1 and the coil of a relay 30CR to the line 435.

Figure 35:
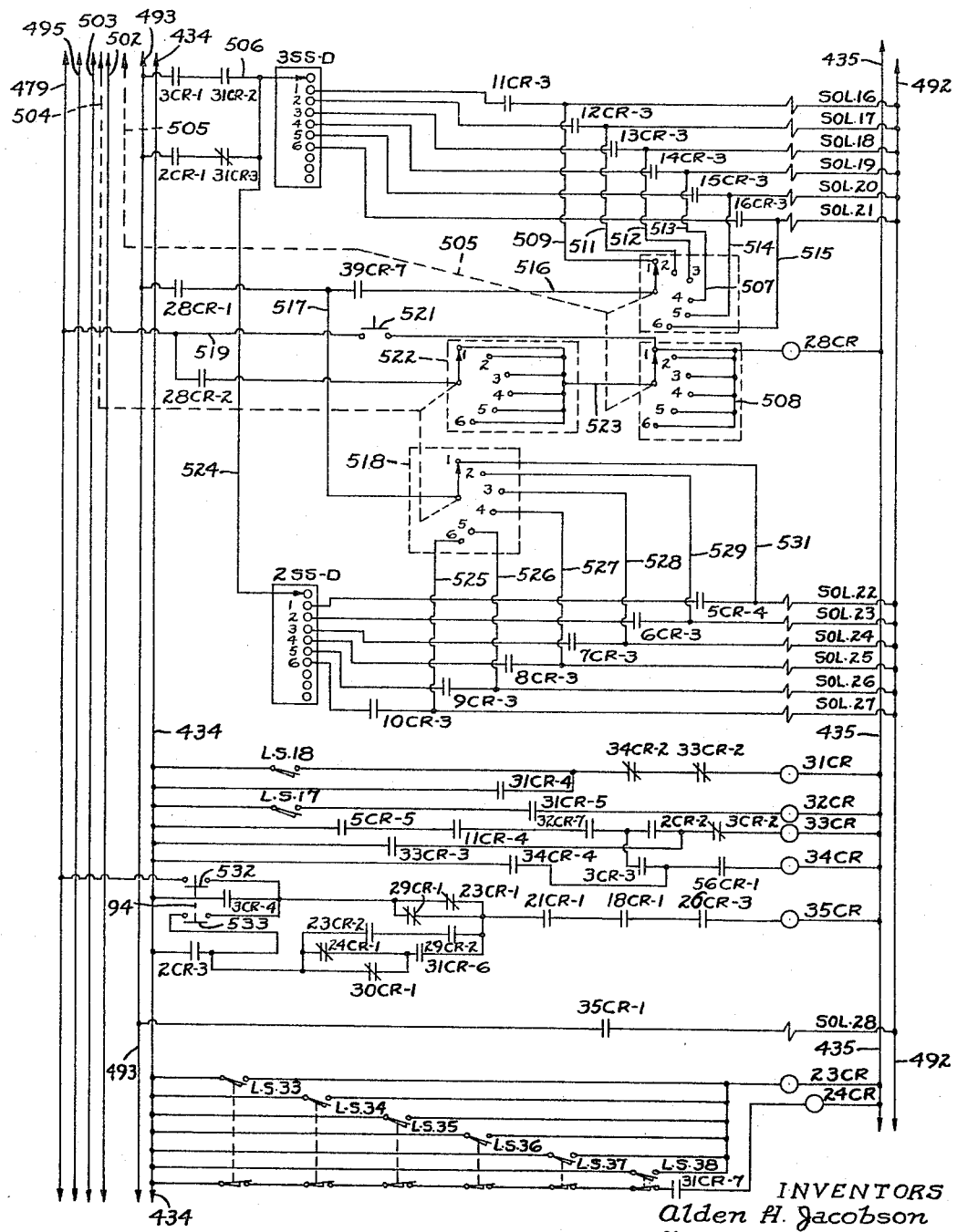

Referring now to FIG. 35, please note that the mechanical connection 504 enters this figure of the drawing from FIG. 33 where it is shown as operated by the switch 454. A mechanical connection 505 also enters the drawing from FIG. 33 where it is shown as mechanically connected to the switch 476; otherwise, the power lines are the same as in the other drawings. The power line 493 is connected through a normally-open contact 3CR–1, a normally-open contact 31CR–2, and a line 506 to the wiper stud of a stepping switch 3SS–D. Stud #1 of the stepping switch 3SS–D is connected through a normally-open contact 11CR–3 and the solenoid SOL 16 to the line 492. Stud #2 is connected through a normally-open contact 12CR–3 and the solenoid SOL 17 to the line 492. Stud #3 is connected through a normally-open contact 13CR–3 and the solenoid SOL 18 to the line 492. Stud #4 is connected through a normally-open contact 14CR–3 and the solenoid SOL 19 to the line 492. Stud #5 is connected through the normally-open contact 15CR–3 and the solenoid SOL 20 to the line 492, and stud #6 is connected to a normally-open contact 16CR–3 and the solenoid SOL 21 to the line 492. The apparatus is provided with two six-position switches 507 and 508 which are mechanically connected together and are also connected mechanically through the connection 505 to the switches 475 and 476. The #1 contact of the switch 507 is connected by a line 509 to a common point between the normally-open relay 11CR–3 and the solenoid SOL 16. The #2 contact is connected by a line 511 to the common point between the normally-open contact 12CR–3 and the solenoid SOL 17. The #3 contact is connected by a line 512 to the common point between the normally-open contact 13CR–3 and the solenoid SOL 18. The #4 contact of the switch 507 is connected by a line 513 to the common point between the normally-open contact 14CR–3 and the solenoid SOL 19. The #5 contact of the switch is connected by a line 514 to the common point between the normally-open contact 15CR–3 and the solenoid SOL 20. The #6 contact of the switch 507 is connected by a line 515 to a common point between the normally-open contact 16CR–3 and the solenoid SOL 21. The contact finger of the switch 507 is connected by a line 516 through a normally-open contact 39CR–7 and the normally-open contact 28CR–1 to the line 502. The common point between the normally-open contact 28CR–1 and the normally-open contact 39CR–7 is connected by a line 517 to the contact finger of a six-position switch 518. The line 479 is connected by a line 519 through a tool release push button switch 521 to contact #1 of the six-position switch 508 which, in turn, is connected through the coil of a relay 28CR to the power line 435. The other contacts of the switch 508 are connected together and connected to the same side of the coil of the relay 28CR as is contact #1. The switches 507 and 508 are mechanically connected together and also are connected mechanically by the line 505 to the switches 475 and 476 in FIG. 33. The line 479 is also connected through a normally-open contact 28CR–2 to the contact finger of a six-position switch 522. All six positions of the switch 522 are connected together and also are connected by a line 523 to the contact finger of the switch 508. The switch 518 and the switch 522 are mechanically connected together and are connected back through the mechanical connection 504 to the switches 453 and 471 in the switch 82, shown in FIG. 33. The line 493 is connected through the normally-open contact 2CR–1 and the normally-closed contact 31CR–3 not only to the line 506 (which, in turn, is connected to the stepping switch 3SS–D) but also by a line 524 to the wiper contact of the stepping switch 2SS–D. The studs #1, 2, 3, 4, 5, and 6 of the stepping switch 2SS–D are connected, respectively, through the normally-open contact 5CR–4 and the solenoid SOL 22, the normally-open contact 6CR–3 and the solenoid SOL 23, the normally-open contact 7CR–3 and the solenoid SOL 24, the normally-open contact 8CR–3 and the solenoid SOL 25, the normally-open contact 9CR–3 and the solenoid SOL 26, and the normally-open contact 10CR–3 and the solenoid SOL 27, to the line 492. In addition, the common point between the normally-open contact 10CR–3 and the solenoid SOL 27 is connected by a line 525 to contact #6 of the switch 518. The common point between the normally-open contact 9CR–3 and the solenoid SOL 26 is connected by a line 526 to contact #5 of the switch 518. The common point between the normally-open contact 8CR–3 and the solenoid SOL 25 is connected by a line 527 to the #4 contact of the switch 518. The common point between the normally-open contact 7CR–3 and the solenoid SOL 24 is connected by a line 528 to the #3 contact of the switch 518. The common point between the normally-open contact 6CR–3 and the solenoid SOL 23 is connected by a line 529 to contact #2 of the switch. The common point between the normally-open contact 5CR–4 and the solenoid SOL 22 is connected by a line 531 to the #1 contact of the switch 518.

The line 434 is connected through the limit switch LS18, a normally-closed contact 34CR–2, a normally-closed contact 33CR–2, and the coil of the relay 31CR to the line 435. A common point between the limit switch LS18 and the normally-closed contact 34CR–2 is connected back through a normally-open contact 31CR–4 to the line 434. The line 434 is also connected through the limit switch LS17, a normally-open contact 31CR–5, and the coil of the relay 32CR to the line 435. The line 434 is connected through a normally-open contact 5CR–5, a normally-open contact 11CR–4, a normally-open contact 32CR–7, a normally-open contact 2CR–2, a normally-closed contact 3CR–2, and the coil of the relay 33CR to the line 435. A common point between the normally-open contact 2CR–2 and the normally-closed contact 3CR–2 in this line is connected back through a normally-open contact 33CR–3 to the line 434. A common point in that same line between the normally-open contact 32CR–7 and the normally-open contact 2CR–2 is connected through a normally-open contact 3CR–3, a normally-open contact 56CR–1, and the coil of the relay 34CR to the line 435. In addition, the common point between the last-named normally-open contact 3CR–3 and the normally-open contact 56CR–1 is connected back through a normally-open contact 34CR–4 to the line 434.

One side of a normally-open contact 3CR–4 is connected to the line 434, while the other side is connected through a normally-closed contact 23CR–1, a normally-open contact 21CR–1, a normally-open contact 18CR–1, a normally-open contact 26CR–3, and the coil of a relay 35CR to the line 435. A normally-closed contact 29CR–1 is connected around the normally-closed contact 23CR–1. In addition, the said other side of the normally-open contact 3CR–4 is connected back to an open contact 532 of the presenter "RETRACT-EXTEND" switch 94 to the line 479. The same other side of the normally-open contact 3CR–4 is connected to an open contact 533 of the same presenter switch 94 and is connected to the line 434 through the switch 533 and a normally-open contact 2CR–3. A common point between the contact 533 and the normally-open contact 2CR–3 just described is connected through a normally-open contact 23CR–2 and a normally-open contact 29CR–2 to a common point between the normally-closed contact 23CR–1 and the normally-open contact 21CR–1. The common point between the contactor 533 and the normally-open contact 2CR–3 is also connected through a normally-closed contact 24CR–1 and a normally-open contact 31CR–6 to the common point between the normally-closed contact 23CR–1 and the normally-open contact 21CR–1. In addition, the normally-closed contact 24CR–1 has connected across it a normally-closed contact 30CR–1.

The line 493 is connected through a normally-open contact 35CR–1 and the solenoid SOL 28 to the line 492. As is evident in the drawing, the limit switches LS33, LS34, LS35, LS36, LS37, and LS38 are formed with two portions, each portion being a distinctive switch; however, the two portions of each switch operate together mechanically. Each of the first portions of these switches is connected on one side to the power line 434 and on the other side through the coil of the relay 23CR to the line 435. The second portions of all of these switches are connected in series with one another from the line 434 through a normally-open contact 31CR–7 and the coil of a relay 24CR to the line 435.

Figure 36:
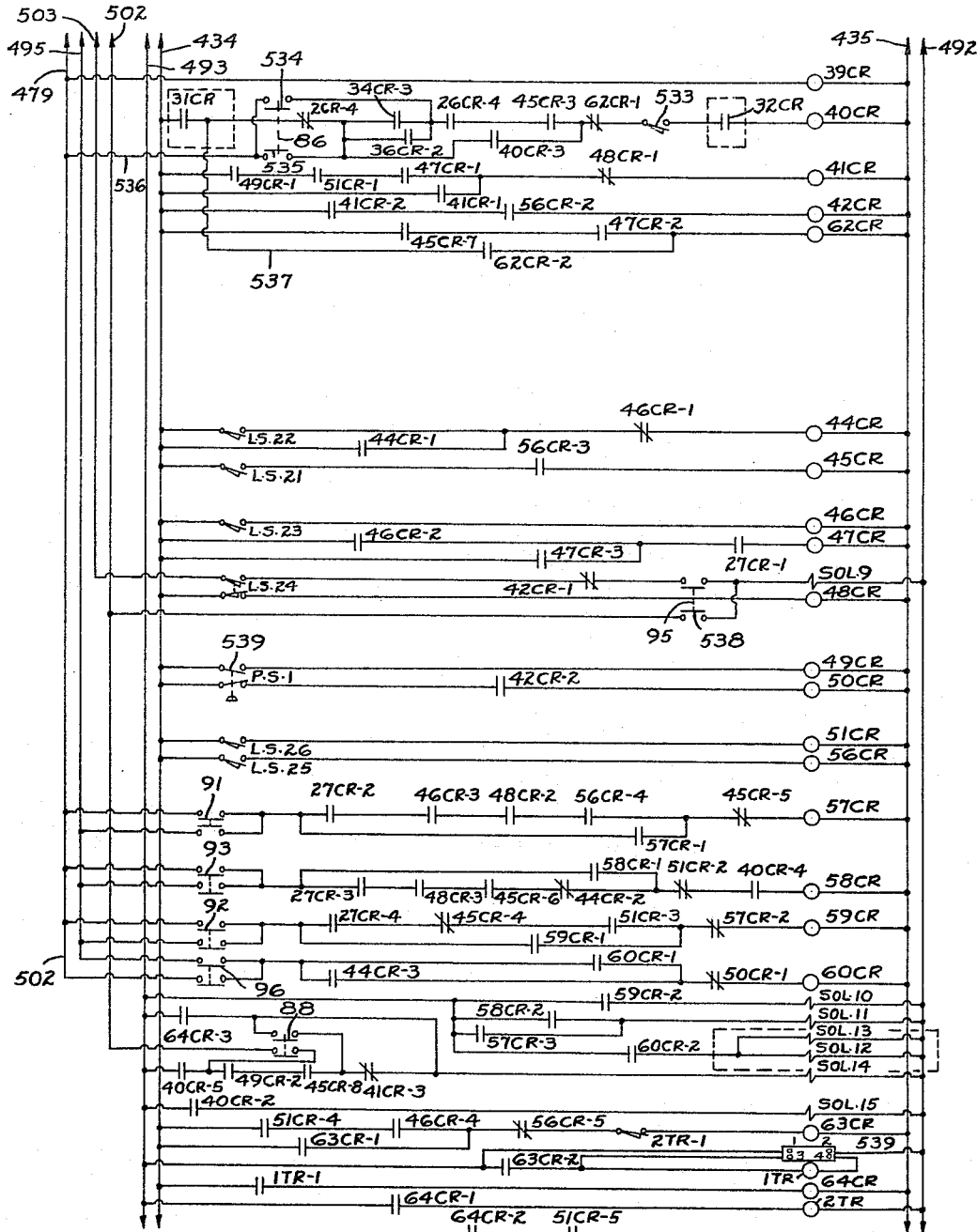

In FIG. 36 the same power lines and connections exist as in the other drawings, and it can be seen that the coil of the relay 39CR is connected directly from the line 479 to the power line 435. A contact 31CR is connected on one side to the line 434 and on the other side is connected through a normally-closed contact 2CR–4, a normally-open contact 34CR–3, a normally-open contact 26CR–4, a normally-open contact 45CR–3, a normally-closed contact 62CR–1, a switch 533, a normally-open contact 32CR, and the coil of a relay 40CR to the power line 435. The switch 533 is a spindle speed switch which is closed when the spindle is not rotating. The line 479 is connected by a line 536 through a normally-open contact 535 of the switch 86 through a normally-open contact 40CR–3 to a common point between the normally-open contact 45CR–3 and the normally-closed contact 62CR–1. In addition, a line is connected between the common point between the normally-closed contact 2CR–4 and the normally-open contact 34CR–3 to a common point between the normally-open contact 535 of the switch 86 and the normally-open contact 40CR–3. The connection between these two common points is itself connected by a normally-open contact 36CR–2 to a common point between the normally-open contact 34CR–3 and the normally-open contact 26CR–4. The line 536 is also connected through the normally-open contact 534 (which is also part of the switch 86) to the common point between the normally-open contact 34CR–3 and the normally-open contact 26CR–4.

The line 434 is connected through normally-open contact 49CR–1, a normally-open contact 51CR–1, a normally-open contact 47CR–1, a normally-closed contact 48CR–1, and the coil of the relay 41CR to the power line 435. At the same time, the common point between the normally-open contact 47CR–1 and the normally-closed contact 48CR–1 is connected through a normally-open contact 41CR–1 back to the line 434. The line 434 is also connected through a normally-open contact 41CR-2, a normally-open contact 56CR-2, and the coil of a relay 42CR to the power line 435. The line 434 is also connected through a normally-open contact 45CR-7, a normally-open contact 47CR-2, and the coil of the relay 62CR to the power line 435. In addition, a common point between the normally-open contact 47CR-2 and the coil of the relay 62CR is connected back through a normally-open contact 62CR-2 by a line 537 to the side of the contactor 31CR which is not connected to the line 434.

The limit switch 22 is connected on one side to the power line 434 and on the other side through the normally-closed contact 46CR-1 and the coil of the relay 44CR in series to the power line 435. The common point between the limit switch 22 and the normally-closed contact 46CR-1 is connected back through a normally-open contact 44CR-1 to the power line 434. The limit switch 21 is connected on one side to the power line 434 and on the other side through the normally-open contact 56CR-3 and the coil of the relay 45CR to the power line 435. The limit switch LS23 is connected on one side to the power line 434 and on the other side through the coil of the relay 46CR to the power line 435. The power line 434 is connected through a normally-open contact 46CR-2, a normally-open contact 27CR-1, and the coil of the relay 46CR to the power line 435. At the same time, the common point between the normally-open contact 46CR-2 and the normally-open contact 27CR-1 is connected back through a normally-open contact 47CR-3 to the power line 434.

The limit switch LS24 is formed in two electrically separate switch parts. A first part is connected on one side by the line 503 to the corresponding line 503 (see FIG. 34) which is shown as connected to one side of the normally-open contact 498 of the switch 459. The other side of this first part is connected through a normally-closed contact 42CR-1, and one part the chuck "AUTO-MANUAL" switch 95 (see FIG. 5) through the solenoid SOL 9 to the line 492. The second part of the limit switch LS24 is connected on one side to the power line 434 and on the other side through the coil of the relay 48CR to the power line 435. A common point between the upper part of the switch 95 and the solenoid SOL 9 is connected by a line 538 through the lower part of the switch 95 back to the line 502 which, as is evident in FIG. 34, is connected to one side of the normally-open contact 501 forming part of the switch 459.

The spindle chuck pressure switch 539 has two parts also, one of which is closed when the spindle chuck is clamped and the other of which is closed when it is unclamped. One side of the upper portion is connected to the power line 434 and the other side is connected through the coil of a relay 49CR to the power line 435. The lower half of the pressure switch 539 is connected on one side to the line 434 and on the other side through the normally-open contact 42CR-2 and the coil of a relay 50CR to the power line 435. The limit switch LS26 is connected on one side to the power line 434 and on the other side through the coil of a relay 51CR to the power line 435. Similarly, the limit switch LS25 is connected on one side to the power line 434 and on the other side through the coil of a relay 56CR to the power line 435.

The interchanger reset switch 91 is shown as formed in two parts, one of which is open when the other is closed. The upper part is connected on one side to the line 479 and on the other side through the following elements to the power line 435; through the normally-open contact 27CR-2, the normally open contact 46CR-3, the normally-open contact 48CR-2, the normally-open contact 56CR-4, the normally-closed contact 45CR-5, and through the coil of a relay 57CR. A normally-open contact 57CR-1 is connected from a common point between the switch 91 and the normally-open contact 27CR-2 to a common point between the normally-open contact 56CR-4 and the normally-closed contact 45CR-5. Similarly, the common point between the upper part of the switch 91 and the normally-open contact 27CR-2 is connected back to the line 495 by the lower part of the switch 91.

The interchanger "AUTO-START" switch 93 (see FIG. 5) is also formed in two parts, both of which are either on closed or open at the same time. The upper part is connected on one side to the line 479, while the bottom half is connected on that same side to the line 495. The other side of both parts of the switch 93 are connected together and are connected through the following elements to the line 435: a normally-open contact 27CR-3, a normally-open contact 48CR-3, a normally-open contact 45CR-6, a normally-closed contact 44CR-2, a normally-closed contact 51CR-2, a normally-open contact 40CR-4, and the coil of a relay 58CR all in series. The common point between the switch 93 and the normally-open contact 27CR-3 is connected to a common point between the normally-closed contact 44CR-2 and the normally-closed contact 51CR-2 by a normally-open contact 58CR-1.

The interchanger 180° switch 92 is formed as two switch halves which are either closed together or open together, one side of the upper switch being connected to the line 479 and the same side of the bottom switch being connected to the line 495. The other sides of the two portions of the switch 92 are connected together and are connected through a normally-open contact 27CR-4, a normally-closed contact 45CR-4, a normally-open contact 51CR-3, a normally-closed contact 57CR-2, and the coil of the relay 59CR in series to the power line 435. A jumper is formed by a normally-open contact 59CR-1 between a common point between the switch 92 and the normally-open contact 27CR-4, on the one hand, and a common point between the normally-open contact 51CR-3 and the normally-closed contact 57CR-2, on the other hand.

The clamp switch 96 is also formed with two switch halves which are both either open or closed, the upper portion of which is connected on one side to the line 495 and the bottom portion of which is connected on that same side to the line 479. The other sides of the two switch halves are connected together and are connected a normally-open contact 44CR-3 and a normally-open contact 69CR-1 in parallel. The other sides of these two normally-open contacts are connected through a normally-closed contact 50CR-1 and the coil of the relay 60CR in series to the line 435.

Line 493 is connected to the line 492 through a normally-open contact 59CR-2 and the solenoid SOL 10. The line 493 is also connected to the line 492 through a normally-open contact 58CR-2 and the solenoid SOL 11. Furthermore, these two lines are connected together by a normally-open contact 60CR-2 and the solenoid SOL 12. The solenoid SOL 13 is connected between a common point between the normally-open contact 60CR-2 and the solenoid SOL 12 to the line 492. Furthermore, a normally-open contact 57CR-3 is connected from the line 493 to a common point between the normally-open contact 58CR-2 and the solenoid SOL 11. The line 493 is connected through a normally-open contact 64CR-3 and the solenoid SOL 14 to the line 492; in addition, the line 493 is connected to a common point between the normally-open contact 64CR-3 and the solenoid SOL 14 by the following elements in series:

a normally-open contact 40CR-5, a normally-open contact 49CR-2, a normally-open contact 45CR-8, and a normally closed contact 41CR-3. The interchange "UP-DOWN" switch 88 is located in this area and consists of an upper switch and a lower switch, both of which are either open or closed at the same time. The upper portion of the switch 88 is connected from a common point between the normally-open contact 64CR-3 and the solenoid SOL 14 to a common point between the normally-open contact 45CR-8 and the normally-closed contact 41CR-3. The bottom portion of the switch 88 is connected on one side to the line 502 and on the other side to a common point between the normally-open contact 40CR–5 and the normally-open contact 49CR–2.

The line 493 is connected to the line 492 by a normally-open contact 40CR–2 and the solenoid SOL 15 in series. The line 434 is connected through a normally-open contact 51CR–4, a normally-open contact 46CR–4, a normally-closed contact 56CR–5, a timer contact 2TR–1, and the coil of the relay 63CR all in series to the power line 435. In addition, the common point between the normally-open contact 46CR–4 and the normally-closed contact 56CR–5 is connected back through a normally-open contact 63CR–1 to the power line 434.

The line 493 is connected to one of the input posts of an electronic timing relay 539, while the other of the input posts is connected to the line 492. The two output posts are connected together by the coil of the relay 1TR and the common point between one output post and the coil of the relay 1TR is connected through a normally-open contact 63CR–2 to the line 493. The line 434 is connected to a normally-open timer contact 1TR–1 and the coil of a relay 64CR to the power line 435. In addition, the line 493 is connected through a normally-open contact 64CR–1 and the coil of a timer contact 2TR in series to the line 492. Normally-open contacts 64CR–2 and 51CR–5 are connected in series, the non-common sides being connected by lines 540 and 541 to the opposite sides of a jog circuit and a variable drive.

The operation of the invention will now be readily understood in view of the above description. The tool changer 40 is, of course, an attachment for use with the machine tool 41. As has been described above, the tool changer consists of seven major units: (1) the storage rack 65, (2) the presenter 64, (3) the interchanger 63, (4) the spindle 56 with the collet chuck, (5) the hydraulic counterweight cylinder 72, (6) the presenter vertical stop 313, and (7) the tool storage cylinder 74. The storage rack 65 is capable of storing 36 pre-set tools. This rack is mounted on the main supporting structure 67 and is adjustable by means of the tool storage adjusting cylinder 74. This adjustment is used to align the tool storage unit with the machine tool 41. The housing 59 of the machine tool 41 is capable in the preferred embodiment of an 18-inch spindle carrier adjustment to set the rapid traverse or upper rest position. Thus, the storage rack has to be adjusted accordingly. The tool storage adjustment cylinder 74 has an 18-inch scale mounted on it. When the position from which rapid traverse starts is known for a given setup on the machine tool, the stop pin 358 (see FIG. 27) is moved to the proper setting and then is locked securely by means of the T-bolts 361 and 362. The storage rack is then moved hydraulically by means of the throttle handles on the valves 78 and 105 (see FIG. 3), so that it rests on the stop pin and so that the latch finger 344 is engaged with the finger 342. The machine tool spindle carrier is then adjusted so that the feeler blocks 178 and 179 are in line (see FIGS. 2 and 7), these blocks being mounted on the interchanger 63 and the presenter 64.

The direction of travel of the tool storage adjusting cylinder is controlled by the throttle handles associated with the valves 78 and 105 which are mounted on the side wall of the main supporting structure 67 of the tool changer. These valves or throttles are spring-centered, so that, when they are released, they return to center, shutting off the oil supply. As is evident in FIG. 31, the cylinder 74 has only one hydraulic line to it, and this is the storage rack "UP" oil. The "DOWN" oil is forced out through the same line by the weight of the storage rack and is controlled by the "DOWN" rack throttle. A check valve is provided in this line to keep the cylinder full of oil at all times.

The interchanger 63 is a self-contained unit that is mounted on the side of the machine tool, and it is the only portion of the tool changer that is mounted on the machine tool. This unit interchanges the used tool with the new tool for the next operation and has three functions. First, it is used to grip the used tool holder and simultaneously to grip the new tool holder. Then, it is used to remove the used tool holder from the collet chuck and remove the new tool holder from the presenter socket. It then serves to interchange or rotate the tools by 180°. The interchanger rotation has three positions and these are called "180° clockwise," "neutral," and "180° counter-clockwise," the neutral position being halfway between the 180° rotations and is the normal, idle position for the interchanger grippers. In the preferred embodiment, the interchanger has a 3¼ inch stroke up and down to insert the tool holder and tool into the chuck and into the presenter arm socket and, of course, conversely, to remove the tool from the chuck and from the presenter arm. The grippers have a 9/32 inch stroke up and down for clamping and unclamping. The collet chuck forming the part of the spindle 56 of the machine tool is air-operated and uses air to unclamp. The chuck uses the internal gear teeth 373 of the tool holder 57 as drivers and, of course, the chuck has matching teeth. At the time of collet location, the gear teeth do not engage radially, the pitch diameter of the teeth in the chuck being oversized, so that the collet socket locates on the cylindrical surface 365 of the tool adapter, not on the teeth.

The presenter 64 consists, generally, of three units: the presenter arm, the presenter carrier, and the presenter bracket. The bracket is mounted on the storage rack and is capable of traveling 27½ inches vertically. This travel is controlled by the hydraulic counterweight cylinder 72 and connected by a chain 68. Location of the vertical movement of this bracket is controlled by the presenter vertical stop which is shown in FIGS. 23, 24, and 25. A signal from the tape passing through the control apparatus 43 tells the presenter assembly what tool is to be selected or to be put away. Upon receiving this signal, the presenter travels vertically to the proper storage hole. The presenter always starts from the 1—1 position in the lower left-hand corner of the rack and travels up. As the presenter travels up, the hydraulic counterweight travels down. The cam head 77 on the counterweight (see FIG. 37) eventually contacts the proper limit switch. The counterweight piston travels rapid traverse until the proper limit switch is contacted. This limit switch causes the locator on the presenter vertical stop to move outwardly and also starts the slow-down. The vertical stop assembly is rotated by the rack 316 and the gear 317 (see FIG. 23), the rack being mounted on the presenter bracket and the gear on the locating cam. As the cam stops on the movable locator, another limit switch LS13 is closed. This is the final location switch. The horizontal travel of the presenter is controlled in a similar manner except that the travel or motion of the presenter carrier is controlled by a hydraulic motor and chain drive. The carrier travels to the proper position horizontally and a final location limit switch is closed. When both final limit switches have been closed, the presenter arm extends and picks up the tool holder. The presenter arm "EXTEND" limit switch is closed and the locking rods extend. The locking rods are actuated by solenoid-operated air cylinders, and those at the top of the horizontal and vertical rows will unlock only a particular tool holder. The presenter arm then retracts and the presenter assembly returns to the 1—1 position waiting for an interchange cycle. The locking rods, incidentally, can be operated by selector switches by positioning the vertical and horizontal selector switches 82 and 83 in FIG. 5 to the proper condition, the locking rods will permit a tool holder in that particular position to be removed or replaced. All of the units, of course, can be operated manually.

In the control apparatus 43 the relay logic panels for performing tool change also contain three stepping switches which add a word No. 9 to the normal eight-word tab sequential tape format of the numerical positioning control system. This word No. 9 consists of three digits; the first digit carries a coding that a new tool is required, or that a tool is to be returned to storage. The second digit indicates which vertical bank a tool is stored in, and the third digit indicates the proper horizontal position a tool is stored in. When the three "word No. 9" stepping switches have been positioned and the master stepping switch ISS-B has moved to stud #23, the relay 1CR is energized and locked up through contacts 33CR–1, 34CR–1, and 1CR–1. The contacts 1CR–3 and 1CR–4 allow the changer circuits to cycle the tool changer. When a tool has been removed from storage or a tool has been returned to the storage rack, the relays 33CR or 34CR will de-energize the relay 1CR.

The tool changer operates sequentially in both manual and automatic modes. Therefore, to obtain any manual cycle all selector switches must be in the extreme left-hand or "auto" positions initially. Then, the selector switches must be operated in the proper sequence to obtain a complete manual cycle. In a manual new tool cycle the following steps must be taken:

(1) The changer switch 459 is moved to "manual" position.

(2) The vertical selector 82 is moved to a desired vertical position.

(3) The horizontal selector 83 is moved to a desired horizontal position.

(4) The presenter up-down switch 86 is moved to up position.

(5) The presenter left-right switch 84 is moved to right position and will move the presenter to the right.

(6) The presenter retract-extend switch 94 is moved to "extend" to extend the presenter.

(7) The tool release push button 85 is pressed. Operating this push button will release the two pre-selected tool locking rods.

(8) The presenter retract-extend switch 94 is placed in the "retract" position.

(9) The vertical horizontal selector switches 82 and 83 are moved to the 1—1 position or "home" position to lock the tool rods.

(10) The presenter down-up switch 86 is moved to "down" which sends the presenter down.

(11) The presenter left-right switch 84 is moved to the left sending the presenter to the left.

This brings the tool down into "home" position ready for an interchange cycle.

In order to form a manual interchange cycle, the following steps must be taken:

(1) Change the switch 459 to "manual."

(2) The presenter arm up-down switch 86 is placed in "down" position.

(3) The interchanger auto-start switch to "start" which rotates the interchanger arm 90° counterclockwise to a positive stop.

(4) The clamp valve 96 is switched to "hand" to close the interchanger arm grippers.

(5) The chuck switch 95 is changed to "hand" which unclamps the spindle collet.

(6) The interchanger up-down switch 88 is moved to "down" position. This sends the interchanger arm down moving the tool holders from the spindle and from the presenter arm.

(7) The interchanger 180° switch 92 rotates the interchanger arm clockwise to a positive stop.

(8) The interchanger up-down switch 88 is changed to "up" sending the interchanger arm up.

(9) The chuck auto-hand switch 95 is changed to "auto" which clamps the spindle collet.

(10) The clamp auto-hand switch 96 is moved to "auto" which unclamps the interchange gripper jaws.

(11) The interchanger auto-reset switch 91 is changed to "rest" which rotates the interchange arm to 0° position.

(12) The presenter arm up-down switch 86 is changed to "UP" which sends the presenter arm up again.

In order to bring about an automatic or programmed new tool cycle, let us assume that the word No. 9 on the tape 46 is coded 2–2–6 to obtain a tool from position 2–6 in the storage rack. The stepping switch 2SS is positioned by the tape to stud #2. The stepper bank 2SS–B is in series with the contact 45CR–1 (see FIG. 33) and the normally-closed contact 32CR–1. This energizes the relay 4CR which, in turn, energizes the A.C. relay 4CR–4 at the bottom of FIG. 33. When this happens, the solenoid SOL 4 is energized through the contact 26CR–1, the contact 36CRA–1, and the contact 4CRA–1 (which is now closed). This has the effect of sending the tool presenter up. Simultaneously, the stepping switch 3SS–B (which has been positioned to stud #6) is in series with the contact 45CR–2 and 32CR–3, thus energizing the relay 19CR. This energizes solenoid SOL 2 through the contacts 26CR–1, 19CR–2, and 22CR–1. The energization of solenoid SOL 2 moves the presenter to the right.

As the presenter 64 approaches the commanded vertical position, limit switch LS2 closes to energize the relay 6CR (in the middle of FIG. 34). This energizes the relay 17CR through the closing of the normally-open contact 6CR–2, thus setting up a circuit through 2SS–C and the normally-closed contact 32CR–2. The energization of the relay 17CR opens the normally-closed contact 17CR–2 (in the upper part of FIG. 34), thus de-energizing solenoid SOL 5 and extending the vertical locator. The locator extended operates the limit switch LS15 and energizes the relay 37CR in the upper part of FIG. 34. The energization of the relay 37CR also energizes the relay 17CRA through the closing of the normally-open contact 17CR–1 and the normally-open contact 37CR–3. Relay 17CRA, in turn, energizes the solenoid SOL 6 because of the closing of the normally-open contact 17CRA–1. The solenoid SOL 6 has the effect of slowing down the vertical traverse rate. Eventually, the positive stop limit switch LS13 is operated and the closing of LS13 and the contact 37CR–2 energizes the relay 18CR (in the center portion of FIG. 33) indicating that the presenter is located at the vertical commanded position.

When the presenter 64 nears the commanded horizontal position, the limit switch LS12 is operated to energize the relay 16CR (see the center of FIG. 34). This brings about the energization of the relay 20CR by a circuit passing through the contact 16CR–2 and the stepping switch 3SS–C. This causes the solenoid SOL 7 to be energized by means of the closing of the normally-open contact 20CR–1 and the solenoid 7 has the effect of extending the horizontal locator. This locator when extended operates limit switch LS 16 and energizes the relay 25CR (at the top of FIG. 34). This brings about the energization of the solenoid SOL 8 because of the closing of the normally-open contact 25CR–3 (the normally-open contact 20CR–1 having been previously closed by the energization of the relay 20CR). The solenoid SOL 8 results in horizontal slowdown. At the positive stop the limit switch LS14 is operated; the limit switch LS14 and the contact 25CR–2 (which is now closed because of the energization of the relay 25CR) cause the current to pass through the coil of the relay 21CR indicating that the presenter is at the commanded horizontal position.

The relay 3CR was energized by the stepping switch 1SS bank No. 1SS–B. This brings about the energization of the relay 35CR (see the lower portion of FIG. 35) because of the closing of the normally-open contact 3CR–4 which allows current to pass through the relay, through the contact 23CR–1 (or 29CR–1), and the contacts 21CR–1, 18CR–1, and 26CR–3. This results in the energization of the solenoid SOL 28 because of the closure of the normally-open contact 35CR–1 (at the bottom of FIG. 35).

With the presenter 64 extended, the limit switch LS18 operates to energize the relay 31CR (in the center of FIG. 35). This results in the energization of the solenoid SOL 23 (in the center of FIG. 35) because of the closure of the normally-open contact 31CR–2 which is in series with the stepper bank 2SS–D (positioned at stud #2) and the contacts 6CR–3. The energization of solenoid SOL 23 operates to unlock the No. 2 vertical tool locking bar. In addition, the solenoid SOL 21 is energized to unlock the No. 6 horizontal locking bar. The energization of the solenoid SOL 21 takes place by a circuit through the contact 3CR–1, the contact 31CR–2, the stepper bank 3SS–D (positioned at stud #6), and the contact 16CR–3.

The vertical locking bar No. 2, when retracted, operates the limit switch LS28 which energizes the relay 29CR (at the bottom of FIG. 34). Similarly, the horizontal locking bar No. 6, when retracted, operates the limit switch LS38 which has the effect of energizing the relay 23CR at the bottom of FIG. 35. The relay 35CR is then de-energized because of the opening of the normally-closed contact 23CR–1 and the opening of the normally-closed contact 29CR–1. This de-energizes solenoid SOL 28 by returning the contact 35CR–1 to its normally-open condition and has the effect of retracting the presenter 64 with its new tool. When the presenter is retracted, the limit switch LS17 is operated to energize the relay 32CR (see the center of FIG. 35). The energization of the relay 32CR causes solenoid SOL 4 to be de-energized because of the opening of the contact 32CR–1 (at the top of FIG. 33). This de-energizes the relay 4CR which, in turn, opens the relay 4CRA (at the bottom of FIG. 33) and re-opens the normally-closed contact 4CRA–2 (in the upper portion of FIG. 34). With the solenoid SOL 4 de-energized, the right solenoid SOL 2 is also de-energized by the de-energization of the relay 19CR which opens its normally-closed contact 19CR–4, the relay 19CR having been de-energized by the opening of the normally-closed contact 32CR–3 (in the center of FIG. 33). The relay 17CR is de-energized by the opening of the normally-closed contact 32CR–2 and thus the relay 17CRA is de-energized by the returning of the contactor 17CR–1 to its normally-open position. At the same time, the contact 17CR–2 re-closes to energize solenoid SOL 5 (at the top of FIG. 34) which has the effect of retracting the vertical locator. At the same time, the contact 17CRA–1 reopens to de-energize the slow-down solenoid SOL 6. The solenoid SOL 3 is energized because the contacts 32CR–6 and 4CR–2 energize the relay 36CRA which, in turn, closes the normally-open contact 36CRA–2. The contact 32CR–5 energizes the relay 22CR which, in turn, operates through the contact 22CR–2 to energize the left solenoid SOL 1 (at the top of FIG. 34). This causes the presenter to retract to "home" position. At "home" position, the relay 34CR is energized to prevent obtaining another new tool until an interchange cycle has taken place.

It should be noted at this point that the cycle for placing a tool back in the storage rack is identical in operation to the above, the only difference being that the stepper bank 1SS–B energizes the relay 2CR instead of the relay 3CR. The relay 2CR sets up the tool locking rod sequence from locking the rods before the presenter extends and locking them before the presenter retracts. When the presenter returns to "home" position the relay 33CR is energized to prevent another cycle taking place until a new tool cycle has taken place.

The interchange cycle is initiated by word No. 2 of the tape format and would be punched for either a digit 1 or a digit 3 depending on whether a drilling or a tapping operation was to be performed. The contact 31CR of the control apparatus 43 is in series with the 0 switch 533 (at the top of the FIG. 36) and with the normally-closed contact 2CR–4, the contact 34CR–3, the contact 36CR–2, the contact 26CR–4, the contact 45CR–3, the contact 62CR–1, and the contact 32CR (which is also part of the control apparatus 43) all connected in series to energize the relay 40CR to start the interchange cycle. The relay 40CR is interlocked so that an interchange cannot be initiated while a new tool is being obtained or during a tool storage cycle. An interchange cannot take place unless the previous cycle was a new tool cycle except when at the end of a tape program it is necessary to clear the machine. A special code is used for this purpose. In any case, the energization of the relay 40CR causes the energization of solenoid SOL 15 by the closing of the normally-open contact 40CR–2 (at the bottom of FIG. 36). The solenoid SOL 15 sends the presenter on down. The presenter arm operates limit switch LS20 in its lower position to energize the relay 27CR (see the center of FIG. 34).

The relay 58CR is now energized by means of the relay contacts 27CR–3, 48CR–3, 45CR–6, 44CR–2, 51CR–2, and 40CR–4 (see the center of FIG. 36). This, in turn, energizes the solenoid SOL 11 because of the closing of the normally-open contact 58CR–2. The energization of the solenoid SOL 11 sets in motion the rotation of the interchange arm in the counter-clockwise direction for 90° of rotation at which point the limit switch LS22 is engaged. Now, the limit switch 22 is in series with the normally-closed contact 46CR–1 (at the upper portion of FIG. 36) and thus energizes the relay 44CR.

Eventually, this results in the energization of the relay 60CR (near the bottom of FIG. 36) because of the closure of the normally-open contact 44CR–3 which is in series with the contact 50CR–1 (normally closed). The solenoids SOL 12 and 13 are then energized because of the closing of the normally-open contact 60CR–2 and these solenoids SOL 12 and 13 operate to clamp the grippers of the interchanger arm. The limit switch LS24 is closed, thus energizing solenoid SOL 9 (see the center of FIG. 36), the electricity flowing through the solenoid SOL 9 by means of the normally-closed contact 42CR–1 and the solenoid SOL 9 operates to unclamp the spindle collet. Then the spindle collet is unclamped in that condition, it operates the pressure switch 539 (center of FIG. 36) thus energizing the relay 49CR.

At this stage, the solenoid SOL 14 is energized by the closing of the normally-open contact 49CR–2 and the current flowing through that contact and through the contact 45CR–8 and the contact 41CR–3. The energization of the solenoid SOL 14 sends the inerchanger down, thus removing the tool holders from the spindle and from the presenter arm. With the interchanger arm down the limit switch LS26 operates to energize the relay 51CR (in the center of FIG. 36). The relay 59CR is thus energized, because of the closing of the normally-open contact 51CR–3 and the passage of current through that contact and through the contacts 27CR–4, 45CR–4, and 57CR–2. The closing of the normally-open contact 59CR–2 causes the energization of the solenoid SOL 10 which brings about the effect of rotating the interchange arm clockwise 180° to the +90° position, thus operating the limit switch LS23. The closing of the limit switch LS23 (in the center of FIG. 36), of course, causes the energization of the relay 46CR.

The energization of the relay 46CR closes the normally-open contact 46CR–2 and this, with the normally open contact 27CR–1 being closed at this time, causes the energization of the relay 47CR. This condition, in turn, causes the relay 41CR to be energized because of the closure of the normally-open contact 47CR–1 which operates to permit current to flow through the relay in conjunction with the contacts 49CR–1, 51CR–1, 47CR–1, and 48CR–1. The contact 41CR–3 then opens to de-energize the solenoid SOL 14 which sends the interchange arm up and eventually operates the limit switch LS25 to energize the relay 56CR (see the center of FIG. 36).

The relay 42CR is then energized because of the closing of the normally-open contact 56CR–2 operating in conjunction with the contact 41CR–2 (which is now closed). The contact 42CR–1 then opens to de-energize the solenoid SOL 9 (in the center of FIG. 36) thus clamping the spindle collet and operating the pressure switch 539. The pressure switch cooperates with the relay 42CR–2 (which is now closed) to energize the relay 50CR. The contact 50CR–1 of this relay opens to de-energize the relay 60CR. This causes the contact 60CR–2 to open and de-energize the solenoids SOL 12 and SOL 13, thus unclamping the interchange arm grippers.

With the grippers unclamped, the limit switch LS24 energizes the relay 48CR (center of FIG. 36). This brings about the energization of the relay 57CR because of the closure of the normally-open contact 48CR–2 and the passage of current through that contact and contacts 27CR–2, 46CR–3, 56CR–4, and 45CR–5. In any case, the energization of the relay 57CR causes a closure of the contact 57CR–3 and the energization of solenoid SOL 11, thus rotating the interchange arm counterclockwise to the 0° neutral position where it operates limit switch LS21. The closure of the limit switch LS21 causes energization of the relay 45CR and this operates to de-energize the relay 57CR because of an opening of the normally-closed contact 45CR–5. The opening of the contact 57CR–3 de-energizes the solenoid SOL 11, stopping the interchange arm motion. The relay 62CR (near the top of FIG. 36) is energized through the contacts 45CR–7 and 47CR–2 and its contact 62CR–1 opens to de-energize the relay 40CR, thus ending the cycle. The contact 62CR–3 is connected to the tape start circuit in the control apparatus 43 to allow the program cycle to continue. To clear the machine at the end of a program cycle, the "word No. 9" must be programmed 2–7–0. This energizes the relay 36CR and allows an interchange cycle to be programmed to place the last tool to be positioned for storage in the rack with a final "putaway" cycle.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. In a tool changer for use with a storage rack having rectilinearly-arranged cubicles for holding tools with their axes horizontal, comprising
    (a) a carrier mounted for vertical sliding movement over the face of the rack and having a horizontal track,
    (b) a bracket mounted on the carrier and slidable horizontally along the track, and
    (c) a presenter mounted on the carrier for pivotal movement about an axis parallel to the said track from a first position in alignment with the axis of one of the said tools to a second position perpendicular to the said axis.

2. In a tool changer for use with a storage rack having a vertical face and having rectilinearly-arranged cubicles opening on the face for holding tools with their axes horizontal, comprising
    (a) a carrier mounted for vertical sliding movement over the face of the rack and having a horizontal track,
    (b) a bracket mounted on the carrier and slidable horizontally along the track, and
    (c) a presenter mounted on the carrier for horizontal movement toward or away from the rack along the axis of a tool lying in a cubicle and for pivotal movement about a horizontal axis parallel to the said track from a first position in alignment with the axis of one of the said tools as it lies in a cubicle to a second position perpendicular to the said axis.

3. In a tool changer for use with a machine tool adapted to use one of a plurality of tools with tool holders, comprising
    (a) a rack having a series of cubicles arranged in parallel rows,
    (b) a locking bar extending along each row, each bar having a portion residing in each cubicle of its row when the bar is in a first position, the said portion being adapted to engage a tool holder residing in the cubicle to retain it in place, each bar also having a notch which resides in each cubicle when the bar is in a second position to permit removal or replacement of a tool holder, and
    (c) an actuator associated with each bar to move it from the first position to the second position.

4. In a tool changer for use with a machine tool adapted to use one of a plurality of tools with tool holders, comprising
    (a) a rack having a series of cubicles arranged rectilinearly in vertical and horizontal rows,
    (b) a pair of locking bars extending along each vertical and horizontal row on either side thereof, each bar extending across each cubicle of its row when the bar is in a first position, the said bar being adapted to retain the tool holder in place, each bar also having a notch which resides in each cubicle when the bar is in a second position to permit removal or replacement of a tool holder,
    (c) an actuator associated with each bar to move it from the first position to the second position, and
    (d) controls assuring that only one pair of locking bars in the vertical rows and one pair of locking bars in the horizontal rows is in the second position at any given time.

5. In a tool changer, comprising
    (a) a storage rack for the retention of tools in parallel horizontal rows,
    (b) a carrier mounted for vertical sliding movement over the face of the storage rack,
    (c) a rack mounted on the carrier and extending vertically upwardly therefrom,
    (d) a pinion pivotally mounted on the storage rack for engagement by the rack,
    (e) a cam mounted coaxially of the pinion and rotatable therewith, and
    (f) a stop member mounted on the storage rack and movable toward and away from the cam to selectively engage the cam for positive location of the carrier relative to the storage rack.

6. In a tool changer, comprising
    (a) a storage rack for the retention of tools in parallel horizontal rows,
    (b) a carrier mounted for vertical sliding movement over the face of the storage rack,
    (c) a rack mounted on the carrier and extending vertically upwardly therefrom,
    (d) a pinion pivotally mounted on a horizontal shaft on the storage rack for engagement by the rack,
    (e) a cam with a radial shoulder mounted coaxially of the pinion and rotatable therewith, and
    (f) a stop member mounted on the storage rack and having a hydraulic cylinder to move it toward and away from the cam to selectively engage the cam for positive location of the carrier in a selected position relative to the storage rack, and
    (g) an abutment mounted on the cam and engaging a switch on the rack to indicate when the carrier is in the selected position.

7. In a tool changer for use with a machine tool having a rotatable spindle whose raised position is adjustable, comprising
    (a) a rack having a series of cubicles arranged in parallel rows,
    (b) a support adapted to be located beside the machine tool, the rack being vertically slidable on the support;

(c) a linear actuator extending between the support and the rack, (d) a stop means mounted on the support and accurately adjustable thereover, the stop means serving to engage the linear actuator to stop it in a preselected position relative to the raised position of the machine tool spindle.

8. In a tool changer for use with a machine tool having a rotatable spindle whose vertical position is adjustable, comprising (a) a rack having a series of cubicles arranged in parallel horizontal rows, (b) a support adapted to be located beside the machine tool, the rack being vertically slidable on the support, (c) a linear actuator having a cylinder mounted on the support and a piston rod attached to the rack, (d) a stop means including a hardened metal button mounted on the support and accurately adjustable thereover, the stop means serving to engage a hardened metal button on the piston rod to stop it in a preselected position relative to the raised position of the machine tool spindle, and (e) a latch on the stop means engaging a finger on the piston rod to lock the linear actuator against accidental movement of the rack.

9. Tool changer apparatus for use with a machine tool having a vertical spindle and a chuck on the spindle, comprising (a) a storage rack adapted to be mounted near the machine tool, (b) a presenter adapted to be moved from a selected position over the rack to a fixed position adjacent the machine tool, (c) an interchanger located between the presenter in its said fixed position and the spindle of the machine tool, the interchanger having means to grasp simultaneously a tool in the chuck and a tool in the presenter, the interchanger being capable of vertical movement to remove and replace tools in the chuck and in the presenter, the interchanger being also capable of rotative movement to reverse the positions of tools from the chuck and the presenter, wherein the storage rack is provided with vertical and horizontal rows of apertures arranged in a vertical plane to hold tools with their axes horizontal and the presenter is capable of horizontal and vertical motion from the said fixed position to a selected aperture, the presenter having a carrier which is movable horizontally perpendicular to the plane of the rack to withdraw or replace a tool in the selected aperture in the direction of its axis, the presenter carrier being capable of rotative movement about a horizontal axis parallel to the plane of the rack to rotate a tool from a position at which its axis is horizontal to a position at which its axis is vertical.

10. A tool changer for use with a machine tool having a rotatable spindle and with a storage rack associated with the machine tool having rectilinearly-arranged cubicles for holding tools with their axis horizontal, comprising (a) a carrier mounted for vertical sliding movement over the face of the rack and having a horizontal track, (b) a bracket mounted on the track of the carrier and slidable horizontally along the track, (c) a presenter mounted on the carrier for pivotal movement about an axis parallel to the said track from a first position in alignment with the axis of one of the said tools to a second position perpendicular to the said axis, (d) a housing adapted to be mounted between and adjacent to the said rotatable spindle and the said storage rack, (e) a shaft extending through the housing and rotatable relative thereto, (f) a rod extending coaxially of the shaft and longitudinally slidable relative thereto, (g) a first clamping member fastened to the shaft and extending laterally therefrom, (h) a second clamping member fastened to the rod and extending laterally therefrom, (i) an actuator for producing relative sliding motion between the rod and shaft to bring about a clamping motion between the members, (j) an actuator for producing sliding motion of the shaft relative to the housing, and (k) an actuator for producing a rotative movement of the shaft relative to the housing.

11. A tool changer for use with a machine tool having a rotatable spindle and adapted to use one of a plurality of tools with tool holders, comprising (a) a rack having a series of cubicles arranged in parallel rows, (b) a locking bar extending along each row, each bar having a portion residing in each cubicle of its row when the bar is in a first position, the said portion being adapted to engage a tool holder residing in the cubicle to retain it in place, each bar also having a notch which resides in each cubicle when the bar is in a second position to permit removal or replacement of a tool holder, (c) an actuator associated with each bar to move it from the first position to the second position, (d) a housing adapted to be mounted between and adjacent to the said rotatable spindle and the said rack, (e) a shaft extending through the housing and rotatable relative thereto, (f) a rod extending coaxially of the shaft and longitudinally slidable relative thereto, (g) a first clamping member fastened to the shaft and extending laterally therefrom, (h) a second clamping member fastened to the rod and extending laterally therefrom, (i) an actuator for producing relative sliding motion between the rod and shaft to bring about clamping motion between the members, (j) an actuator for producing sliding motion of the shaft relative to the housing, and (k) an actuator for producing a rotative movement of the shaft relative to the housing.

12. In a tool changer for use with a machine tool adapted to use one of a plurality of tools with tool holders and for use with a storage rack associated with the machine tool having rectilinearly-arranged cubicles for holding the tools with their axes horizontal, comprising (a) a rack having a series of cubicles arranged in parallel rows, (b) a locking bar extending along each row, each bar having a portion residing in each cubicle of its row when the bar is in a first position, the said portion being adapted to engage a tool holder residing in the cubicle to retain it in place, each bar also having a notch which resides in each cubicle when the bar is in a second position to permit removal or replacement of a tool holder, (c) an actuator associated with each bar to move it from the first position to the second position, (d) a carrier mounted for vertical sliding movement over the face of the rack and having a horizontal track, (e) a bracket mounted on the track of the carrier and slidable horizontally along the track, and (f) a presenter mounted on the carrier for pivotal movement about an axis parallel to the said track from a first position in alignment with the axis of one of the said tools to a second position perpendicular to the said axis.

13. A tool changer for use with a machine tool having a rotatable spindle adapted to use one of a plurality of tools with tool holders and with a storage rack associated with the machine tool having rectilinearly-arranged cubicles for holding tool holders with their axes horizontal, comprising
(a) a rack having a series of cubicles arranged in parallel rows,
(b) a locking bar extending along each row, each bar having a portion residing in each cubicle of its row when the bar is in a first position, the said portion being adapted to engage a tool holder residing in the cubicle to retain it in place, each bar also having a notch which resides in each cubicle when the bar is in a second position to permit removal or replacement of the tool holder,
(c) an actuator associated with each bar to move it from the first position to the second position,
(d) a carrier mounted for vertical sliding movement over the face of the rack and having a horizontal track,
(e) a bracket mounted on the track of the carrier and slidable horizontally along the track,
(f) a presenter mounted on the carrier for pivotal movement about an axis parallel to the said track from a first position in alignment with the axis of one of the said tool holders to a second position perpendicular to the said axis,
(g) a housing adapted to be mounted between and adjacent to the said rotatable spindle of the machine tool and the said rack,
(h) a shaft extending through the housing and rotatable relative thereto,
(i) a rod extending coaxially of the shaft and longitudinally slidable relative thereto,
(j) a first clamping member fastened to the shaft and extending laterally therefrom,
(k) a second clamping member fastened to the rod and extending laterally therefrom,
(l) an actuator for producing relative sliding motion between the rod and shaft to bring about a clamping motion between the members,
(m) an actuator for producing sliding motion of the shaft relative to the housing, and
(n) an actuator for producing a rotative movement of the shaft relative to the housing.

14. A tool changer for use with a machine tool having a rotatable spindle, comprising
(a) a storage rack for the retention of tools in parallel horizontal rows,
(b) a carrier mounted for vertical sliding movement over the face of the rack and having a horizontal track,
(c) a bracket mounted on the track of the carrier and slidable horizontally along the track,
(d) a presenter mounted on the carrier for pivotal movement about an axis parallel to the said track from the first position in alignment with the axis of one of the said tools to a second position perpendicular to the said axis,
(e) a rack mounted on the carrier and extending vertically upwardly therefrom,
(f) a pinion pivotally mounted on the storage rack for engagement by the rack,
(g) a cam mounted coaxially of the pinion and rotatable therewith,
(h) a stop member mounted on the storage rack and movable toward and away from the cam to selectively engage the cam for positive location of the carrier relative to the storage rack,
(i) a housing adapted to be mounted between and adjacent to the said rotatable spindle of the machine tool and the said rack,
(j) a shaft extending through the housing and rotatable relative thereto,
(k) a rod extending coaxially of the shaft and longitudinally slidable relative thereto,
(l) a first clamping member fastened to the shaft and extending laterally therefrom,
(m) a second clamping member fastened to the rod and extending laterally therefrom,
(n) an actuator for producing relative sliding motion between the rod and shaft to bring about a clamping motion between the members,
(o) an actuator for producing sliding motion of the shaft relative to the housing, and
(p) an actuator for producing a rotative movement of the shaft relative to the housing.

15. A tool changer for use with a machine tool having a rotatable spindle whose raised position is adjustable and which is adapted to use one of a plurality of tools with tool holders, comprising
(a) a rack having a series of cubicles arranged in parallel rows,
(b) a support adapted to be located beside the machine tool, the rack being vertically slidable on the support,
(c) a linear actuator extending between the support and the rack,
(d) a stop means mounted on the support and accurately adjustable thereover, the stop means serving to engage the linear actuator to stop it in a preselected position relative to the raised position of the machine tool spindle,
(e) a locking bar extending along each row, each bar having a portion residing in each cubicle of its row when the bar is in a first position, the said portion being adapted to engage a tool holder residing in the cubicle to retain it in place, each bar also having a notch which resides in each cubicle when the bar is in a second position to permit removal or replacement of the tool holder,
(f) an actuator associated with each bar to move it from the first position to the second position,
(g) a housing adapted to be mounted between and adjacent to the said rotatable spindle of the machine tool and the said rack,
(h) a shaft extending through the housing and rotative relative thereto,
(i) a rod extending coaxially of the shaft and longitudinally slidable relative thereto,
(j) a first clamping member fastened to the shaft and extending laterally therefrom,
(k) a second clamping member fastened to the rod and extending laterally therefrom,
(l) an actuator for producing relative sliding motion between the rod and shaft to bring about a clamping motion between the members,
(m) an actuator for producing sliding motion of the shaft relative to the housing, and
(n) an actuator for producing a rotative movement of the shaft relative to the housing.

16. A tool changer for use with a machine tool having a rotatable spindle whose raised position is adjustable and which is adapted to use one of a plurality of tools with tool holders, comprising
(a) a support adapted to be located beside the machine tool, the rack being vertically slidable on the support,
(b) a carrier mounted for vertical sliding movement over the face of the rack and having a horizontal track,
(c) an elongated tool holder adapted to reside in a cubicle of the rack on occasion,
(d) a chuck adapted to be mounted on the machine tool spindle, the chuck having a socket to receive the tool holder,
(e) teeth extending longitudinally of the tool holder, (f) grooves formed in the socket corresponding to the teeth on the tool holder,
(g) a bracket mounted on the track of the carrier and slidable horizontally along the track,
(h) a presenter mounted on the carrier for pivotal movement about an axis parallel to the said track from a first position in alignment with the axis of one of the said tool holders to a second position perpendicular to the said axis,
(i) a gear rack mounted on the carrier and extending vertically upwardly therefrom,
(j) a pinion mounted on the storage rack for engagement by the gear rack,
(k) a cam mounted coaxially of the pinion and rotatable therewith,
(l) a stop member mounted on the storage rack and movable toward and away from the cam to selectively engage the cam for positive location of the carrier relative to the storage rack,
(m) a locking bar extending along each row on the storage rack, each bar having a portion residing in each cubicle of its row when the bar is in a first position, the said portion being adapted to engage a tool holder residing in the cubicle to retain it in place, each bar also having a notch which resides in each cubicle when the bar is in a second position to permit removal or replacement of a tool holder,
(n) an actuator associated with each bar to move it from the first position to the second position,
(o) a housing adapted to be mounted between and adjacent to the said rotatable shaft of the machine tool and the said storage rack,
(p) a shaft extending through the housing and rotatable relative thereto,
(q) a rod extending coaxially of the shaft and longitudinally slidable relative thereto,
(r) a first clamping member fastened to the shaft and extending laterally therefrom,
(s) a second clamping member fastened to the rod and extending laterally therefrom,
(t) an actuator for producing relative sliding motion between the rod and shaft to bring about a clamping motion between the members,
(u) an actuator for producing sliding motion of the shaft relative to the housing, and
(v) an actuator for producing a rotative movement of the shaft relative to the housing.

17. In a tool changer for use with a machine tool adapted to use one of a plurality of tools each having a tool holder, comprising
(a) a rack having a series of cubicles arranged rectilinearly in vertical and horizontal rows,
(b) a carrier mounted for vertical sliding movement over the face of the rack,
(c) a pair of locking bars extending along each vertical and horizontal row on either side thereof, each bar extending across each cubicle of its row when the bar is in a first position, the said bar being adapted to retain the tool holder in place, each bar also having a notch which resides in each cubicle when the bar is in the second position to permit removal or replacement of the tool holder,
(d) an actuator associated with each bar to move it from the first position to the second position,
(e) controls assuring that only one pair of locking bars in the vertical rows and one pair of locking bars in the horizontal rows is in the second position at any given time,
(f) a bracket mounted on the track of the carrier and slidable horizontally along the track, and
(g) a presenter mounted on the carrier for horizontal movement toward and away from the rack along the axis of the tool lying in a cubicle and for pivotal movement about a horizontal axis parallel to the said track from a first position in alignment with the axis of one of the said tools as it lies in a cubicle to a second position perpendicular to the said axis.

References Cited by the Examiner

UNITED STATES PATENTS

| | | | |
|---|---|---|---|
| 1,442,659 | 1/1923 | Groene | 29—568 X |
| 2,012,556 | 8/1935 | White | 189—7 |
| 3,052,011 | 9/1962 | Brainard | 29—568 |
| 3,129,506 | 4/1964 | Hain | 29—568 |
| 3,132,765 | 5/1964 | Florendo | 221—91 |
| 3,161,951 | 5/1964 | Anthony | 221—91 |

FOREIGN PATENTS 1,276,328  10/1961  France.

RICHARD H. EANES, JR., *Primary Examiner.*